(12) United States Patent
Karr et al.

(10) Patent No.: US 7,945,488 B2
(45) Date of Patent: May 17, 2011

(54) DRILLING COLLABORATION INFRASTRUCTURE

(75) Inventors: George Karr, Lago Vista, TX (US); Simon Fleury, Houston, TX (US); Ken Landgren, Houston, TX (US); Kevin Michael Shaw, Aberdeenshire (GB)

(73) Assignee: Schlumberger Technology Corporation, Houston, TX (US)

( * ) Notice: Subject to any disclaimer, the term of this patent is extended or adjusted under 35 U.S.C. 154(b) by 120 days.

(21) Appl. No.: 12/036,621

(22) Filed: Feb. 25, 2008

(65) Prior Publication Data

US 2008/0208475 A1 Aug. 28, 2008

Related U.S. Application Data

(60) Provisional application No. 60/891,526, filed on Feb. 25, 2007.

(51) Int. Cl.
*G06Q 10/00* (2006.01)

(52) U.S. Cl. .......... 705/28; 707/756; 707/602; 707/809; 707/3

(58) Field of Classification Search ................. 455/430; 705/1, 2, 36 R, 10; 175/38, 207, 218, 50, 175/45; 707/3, 103 R, 10, 24, 999.01, E17, 707/602, 756, 809; 702/9, 6, 85, 188
See application file for complete search history.

(56) References Cited

U.S. PATENT DOCUMENTS

| | | | |
|---|---|---|---|
| 6,519,568 B1 * | 2/2003 | Harvey et al. ...................... 705/1 |
| 6,691,116 B1 * | 2/2004 | Bart ....................................... 1/1 |
| 7,058,853 B1 * | 6/2006 | Kavanappillil et al. ......... 714/13 |
| 7,076,532 B2 * | 7/2006 | Craik ............................. 709/217 |
| 7,080,544 B2 * | 7/2006 | Stepanik et al. ............. 73/31.02 |
| 7,127,460 B2 * | 10/2006 | Nixon et al. ........................... 1/1 |
| 7,142,986 B2 * | 11/2006 | Moran ............................. 702/9 |
| 7,264,050 B2 * | 9/2007 | Koithan et al. .......... 166/250.15 |
| 7,406,436 B1 * | 7/2008 | Reisman ........................ 705/10 |
| 7,496,959 B2 * | 2/2009 | Adelstein et al. ................ 726/21 |
| 7,606,666 B2 * | 10/2009 | Repin et al. ....................... 702/9 |
| 7,707,045 B2 * | 4/2010 | Parkins et al. ..................... 705/3 |
| 7,739,142 B2 * | 6/2010 | Chand et al. .................... 705/10 |
| 7,895,220 B2 * | 2/2011 | Evans et al. .................... 707/756 |

(Continued)

FOREIGN PATENT DOCUMENTS

WO 0225319 * 3/2002

(Continued)

OTHER PUBLICATIONS

Business & Energy Editors/High-Tech Writers. (Nov. 15). Standards Organizations Publish Initial Set of Oil and Gas Industry Reference Data. Business Wire, 1. Retrieved Mar. 25, 2011, from Business Dateline. (Document ID: 63813626).*

*Primary Examiner* — Matthew S Gart
*Assistant Examiner* — Olusegun Goyea
(74) *Attorney, Agent, or Firm* — Yee & Associates, P.C.

(57) ABSTRACT

Methods and systems facilitate collaboration between users at an oil well site and users at a remote location. Multiple types of oil well data are collected at the oil well site to form aggregated data. The aggregated data is stored in a data aggregation server at the oil well site. Users at the oil well site and users at the remote location are allowed to access the aggregated data on the data aggregation server using a standard data format.

13 Claims, 12 Drawing Sheets

U.S. PATENT DOCUMENTS

| | | | |
|---|---|---|---|
| 2002/0087439 A1* | 7/2002 | Lambert et al. | 705/29 |
| 2002/0116457 A1* | 8/2002 | Eshleman et al. | 709/203 |
| 2002/0169777 A1* | 11/2002 | Balajel et al. | 707/10 |
| 2002/0174048 A1* | 11/2002 | Dheer et al. | 705/36 |
| 2002/0188556 A1* | 12/2002 | Colica et al. | 705/38 |
| 2003/0004952 A1* | 1/2003 | Nixon et al. | 707/10 |
| 2004/0059597 A1* | 3/2004 | Tkaczyk et al. | 705/2 |
| 2004/0111487 A1* | 6/2004 | Hooks | 709/217 |
| 2004/0172307 A1* | 9/2004 | Gruber | 705/3 |
| 2004/0231851 A1* | 11/2004 | Silvers | 166/350 |
| 2005/0060191 A1* | 3/2005 | Parkins et al. | 705/2 |
| 2005/0092523 A1* | 5/2005 | McCaskill et al. | 175/38 |
| 2005/0096846 A1* | 5/2005 | Koithan et al. | 702/6 |
| 2005/0154628 A1* | 7/2005 | Eckart et al. | 705/10 |
| 2005/0155070 A1* | 7/2005 | Slaughter | 725/86 |
| 2005/0160361 A1* | 7/2005 | Young | 715/513 |
| 2005/0161260 A1* | 7/2005 | Koithan et al. | 175/57 |
| 2005/0271499 A1* | 12/2005 | Loy et al. | 415/1 |
| 2006/0047527 A1* | 3/2006 | Caveny et al. | 705/1 |
| 2006/0116836 A1* | 6/2006 | Yoshie et al. | 702/85 |
| 2006/0129358 A1* | 6/2006 | Yoshie et al. | 702/188 |
| 2006/0173625 A1* | 8/2006 | Moran | 702/9 |
| 2006/0195550 A1* | 8/2006 | Craik | 709/217 |
| 2006/0240818 A1* | 10/2006 | McCoy et al. | 455/430 |
| 2007/0005154 A1* | 1/2007 | Lancaster et al. | 700/49 |
| 2007/0008186 A1* | 1/2007 | Michaels et al. | 340/945 |
| 2007/0061081 A1* | 3/2007 | Moran | 702/9 |
| 2007/0168352 A1* | 7/2007 | Satyanarayana | 707/10 |
| 2007/0185696 A1* | 8/2007 | Moran et al. | 703/10 |
| 2008/0109448 A1* | 5/2008 | Aboel-Nil et al. | 707/10 |
| 2008/0140537 A1* | 6/2008 | Powell | 705/26 |
| 2008/0155058 A1* | 6/2008 | Prasad et al. | 709/218 |
| 2008/0179094 A1* | 7/2008 | Repin et al. | 175/50 |
| 2008/0181230 A1* | 7/2008 | Hitt et al. | 370/395.1 |
| 2008/0208475 A1* | 8/2008 | Karr et al. | 702/6 |
| 2008/0285733 A1* | 11/2008 | Fisher | 379/114.03 |
| 2008/0294606 A1* | 11/2008 | Moran et al. | 707/3 |
| 2009/0150998 A1* | 6/2009 | Adelstein et al. | 726/22 |
| 2009/0288164 A1* | 11/2009 | Adelstein et al. | 726/22 |

FOREIGN PATENT DOCUMENTS

| | | |
|---|---|---|
| WO | 0225319 A2 | 3/2002 |
| WO | 2004104373 A1 | 12/2004 |

\* cited by examiner

DRILLING COLLABORATION INFRASTRUCTURE

RELATED APPLICATIONS

This application claims priority under 35 U.S.C 119(e) from pending U.S. Provisional Application No. 60/891,526 filed on Feb. 25, 2007 entitled "Drilling Collaboration Infrastructure", the subject matter of which is fully incorporated herein by reference.

BACKGROUND OF THE INVENTION

1. Field of the Invention

The present invention relates to methods, systems, and apparatuses for use in oil well construction and/or drilling projects. In particular, the present invention provides methods, systems, and apparatuses for establishing an infrastructure to facilitate collaboration between oil well construction and drilling project team members at disparate locations.

2. Background of the Invention

Oil wells today are characterized at one end of the spectrum by complex wells in high-cost environments, such as an offshore environment, with less experienced personnel and resources available. At the other end of the spectrum are low-cost, high-volume environments, such as an onshore environment, with very specific and repeating processes. Overlaying this spectrum are significant advances in information technology coupled with rapid progress in rig automation technology.

For both of the above types of well environments, remote operations support activities are attracting significant attention and investment. This is due at least in part to recognition by more companies of the need to be able to react in "real time" relative to an increasing number of drilling measurements. The remote operations support activities may include, for example, revised work processes based on improved upfront models as well as plans that are more integrated with the actual well construction process.

In a typical oil well construction or drilling project where remote operations support is provided, certain members of the project team are located at the rig site, such as an offshore site, where various types of data are collected and numerous site-specific decisions are made. Other project team members provide operations support from a remote location, such as an onshore site, including monitoring, providing technical analysis, and making strategic decisions affecting the overall drilling process. Communication and data transfer between the two locations are typically provided through a standard wired and/or wireless link, such as a satellite link.

The team members at the two disparate locations should be able to collaborate closely and work together efficiently, particularly in high-technology development projects. However, applying conventional information technology to oil well construction or drilling projects can pose special problems that do not otherwise occur or are less significant in a typical office environment. Further, complications are expected to arise going forward as additional measurements are acquired. Predictive models are increasingly used together with more complete monitoring of rig activities, a higher degree of rig automation, fewer people on site, and greater remote support from both service companies and oil company sites.

Accordingly, despite recent advances, there is a need in oil well construction and/or drilling projects for more efficient collaboration between project team members. In particular, there is a need for an infrastructure that can facilitate closer collaboration between such project team members at disparate locations.

SUMMARY OF THE INVENTION

In view of the above problems, an object of the present invention is to provide methods, apparatuses and systems for establishing an infrastructure to facilitate collaboration between oil well construction and drilling project team members at disparate locations while eliminating or minimizing the impact of the problems and limitations described.

Methods and systems facilitate collaboration between users at an oil well site and users at a remote location. Multiple types of oil well data are collected at the oil well site to form aggregated data. The aggregated data is stored in a data aggregation server at the oil well site. Users at the oil well site and the users at the remote location are allowed to access the aggregated data on the data aggregation server using a standard data format.

Additionally, a local copy of the aggregated data can be stored on a local server at the remote location. Users at the remote location can then access the aggregated data on the local server.

The users at the oil well site can access the multiple types of oil well data via one or more private virtual local area networks. Each local area network allows a different level of access to the multiple types of oil well data.

The users at the remote location access the multiple types of oil well data via a satellite communication link.

An operations support center at the remote location allows the users at the remote location to monitor collection of the multiple types of oil well data in real time from the operations support center.

The users at the oil well site and the users at the remote location can access the multiple types of oil well data using a Web-based viewer or an interactive viewer.

The oil well site can be an offshore site and the remote location is an onshore location.

Other objects, features and advantages of the present invention will become apparent to those of skill in art by reference to the figures, the description that follows and the claims.

DETAILED DESCRIPTION OF THE DRAWINGS

In the following detailed description of the preferred embodiments and other embodiments of the invention, reference is made to the accompanying drawings. It is to be understood that those of skill in the art will readily see other embodiments and changes may be made without departing from the scope of the invention.

Figure 1A:
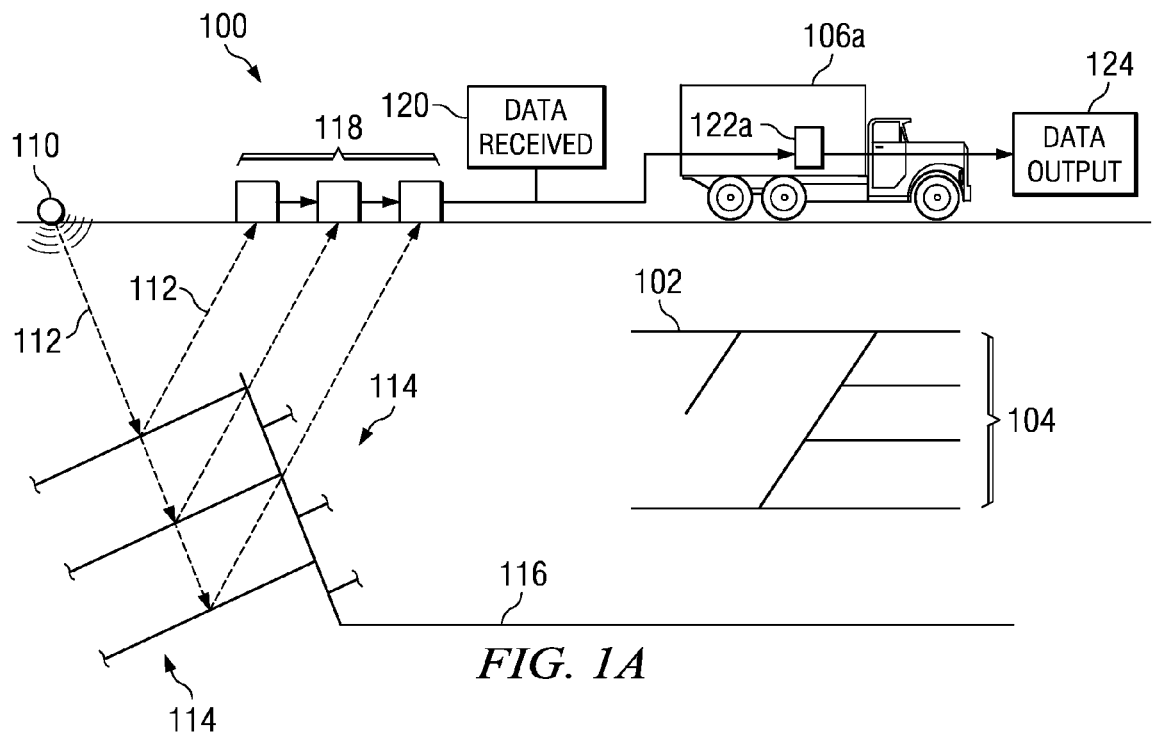
FIGS. 1A-1D depict simplified, representative, schematic views of an oilfield having subterranean formation containing reservoir therein and depicting various oilfield operations being performed on the oilfield.

FIGS. 1A-1D depict simplified, representative, schematic views of oilfield 100 having subterranean formation 102 containing reservoir 104 therein and depicting various oilfield operations being performed on the oilfield. FIG. 1A depicts a survey operation being performed by a survey tool, such as seismic truck 106a, to measure properties of the subterranean formation. The survey operation is a seismic survey operation for producing sound vibrations. In FIG. 1A, one such sound vibration, sound vibration 112 generated by source 110, reflects off horizons 114 in earth formation 116. A set of sound vibration, such as sound vibration 112 is received in by sensors, such as geophone-receivers 118, situated on the earth's surface. In response to receiving these vibrations, geophone receivers 118 produce electrical output signals, referred to as data received 120 in FIG. 1A.

In response to the received sound vibration(s) 112 representative of different parameters (such as amplitude and/or frequency) of sound vibration(s) 112, geophones 118 produce electrical output signals containing data concerning the subterranean formation. Data received 120 is provided as input data to computer 122a of seismic truck 106a, and responsive to the input data, computer 122a generates seismic data output 124. This seismic data output may be stored, transmitted or further processed as desired, for example by data reduction.

Figure 1B:
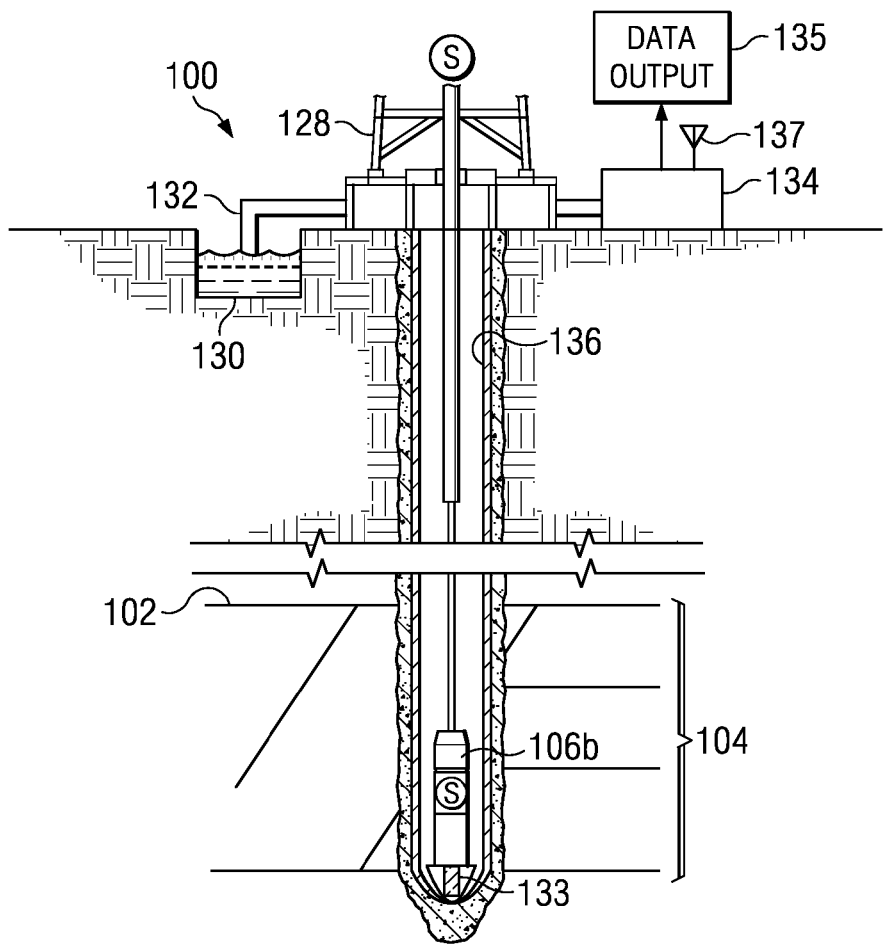

FIG. 1B depicts a drilling operation being performed by drilling tools 106b suspended by rig 128 and advanced into subterranean formations 102 to form well bore 136. Mud pit 130 is used to draw drilling mud into the drilling tools via flow line 132 for circulating drilling mud through the drilling tools, up well bore 136 and back to the surface. The drilling mud is usually filtered and returned to the mud pit. A circulating system may be used for storing, controlling, or filtering the flowing drilling muds. The drilling tools are advanced into the subterranean formations 102 to reach reservoir 104. Each well may target one or more reservoirs. The drilling tools are preferably adapted for measuring downhole properties using logging while drilling tools. The logging while drilling tool may also be adapted for taking core sample 133 as shown, or removed so that a core sample may be taken using another tool.

Surface unit 134 is used to communicate with the drilling tools and/or offsite operations. Surface unit 134 is capable of communicating with the drilling tools to send commands to the drilling tools, and to receive data therefrom. Surface unit 134 is preferably provided with computer facilities for receiving, storing, processing, and/or analyzing data from the oilfield. Surface unit 134 collects data generated during the drilling operation and produces data output 135 which may be stored or transmitted. Computer facilities, such as those of the surface unit, may be positioned at various locations about the oilfield and/or at remote locations.

Sensors S, such as gauges, may be positioned about the oilfield to collect data relating to various oilfield operations as described previously. As shown, sensor S is positioned in one or more locations in the drilling tools and/or at rig 128 to measure drilling parameters, such as weight on bit, torque on bit, pressures, temperatures, flow rates, compositions, rotary speed, and/or other parameters of the oilfield operation. Sensors S may also be positioned in one or more locations in the circulating system.

The data gathered by sensors S may be collected by surface unit 134 and/or other data collection sources for analysis or other processing. The data collected by sensors S may be used alone or in combination with other data. The data may be collected in one or more databases and/or transmitted on or offsite. All or select portions of the data may be selectively used for analyzing and/or predicting oilfield operations of the current and/or other well bores. The data may be historical data, real time data, or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For example, the seismic data output may be used to perform geological, geophysical, and/or reservoir engineering. The reservoir, well bore, surface, and/or process data may be used to perform reservoir, well bore, geological, geophysical, or other simulations. The data outputs from the oilfield operation may be generated directly from the sensors, or after some preprocessing or modeling. These data outputs may act as inputs for further analysis.

The data may be collected and stored at surface unit 134. One or more surface units may be located at oilfield 100, or connected remotely thereto. Surface unit 134 may be a single unit, or a complex network of units used to perform the necessary data management functions throughout the oilfield. Surface unit 134 may be a manual or automatic system. Surface unit 134 may be operated and/or adjusted by a user.

Surface unit 134 may be provided with transceiver 137 to allow communications between surface unit 134 and various portions of oilfield 100 or other locations. Surface unit 134 may also be provided with or functionally connected to one or more controllers for actuating mechanisms at oilfield 100. Surface unit 134 may then send command signals to oilfield 100 in response to data received. Surface unit 134 may receive commands via the transceiver or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the oilfield operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 1C:
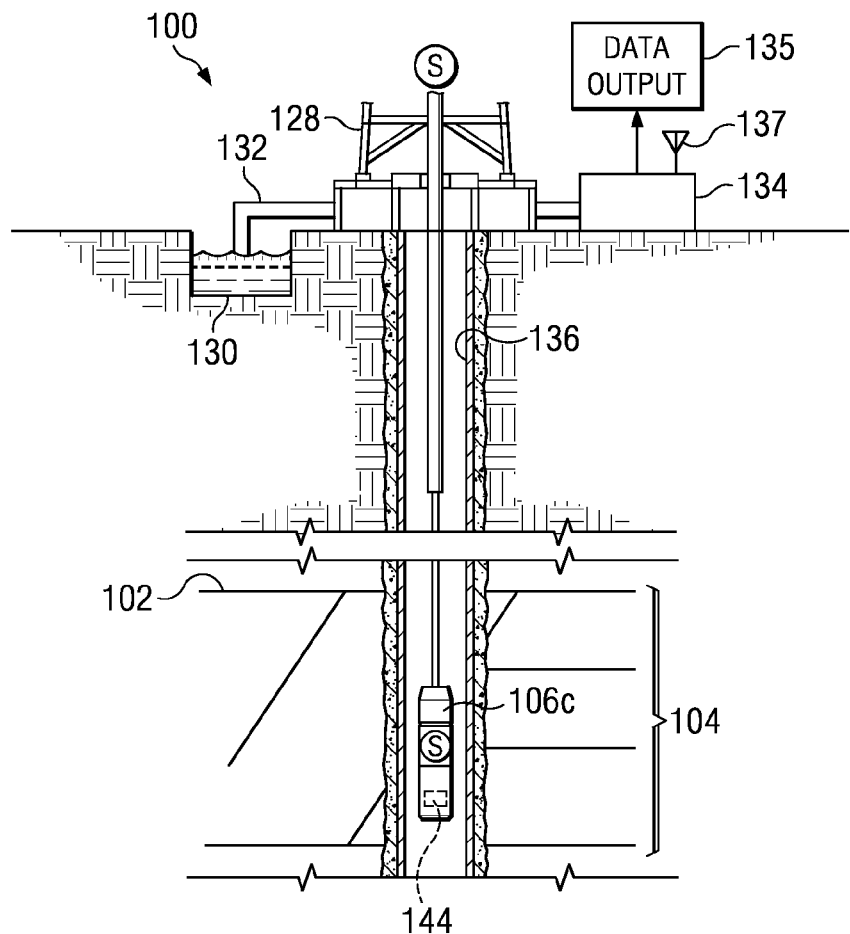

FIG. 1C depicts a wireline operation being performed by wireline tool 106c suspended by rig 128 and into well bore 136 of FIG. 1B. Wireline tool 106c is preferably adapted for deployment into a well bore for generating well logs, performing downhole tests and/or collecting samples. Wireline tool 106c may be used to provide another method and apparatus for to collect information about the subterranean formations. Wireline tool 106c of FIG. 1C may, for example, have an explosive, radioactive, electrical, or acoustic energy source 144 that sends and/or receives signals to surrounding subterranean formations 102 and fluids therein.

Wireline tool 106*c* may be operatively connected to, for example, geophones 118 and computer 122*a* of seismic truck 106*a* of FIG. 1A. Wireline tool 106*c* may also provide data to surface unit 134. Surface unit 134 collects data generated during the wireline operation and produces data output 135 that may be stored or transmitted. Wireline tool 106*c* may be positioned at various depths in the well bore to provide a survey or other information relating to the subterranean formation.

Sensors S, such as gauges, may be positioned about oilfield 100 to collect data relating to various oilfield operations as described previously. As shown, the sensor S is positioned in wireline tool 106*c* to measure downhole parameters which relate to, for example porosity, permeability, fluid composition and/or other parameters of the oilfield operation.

Figure 1D:
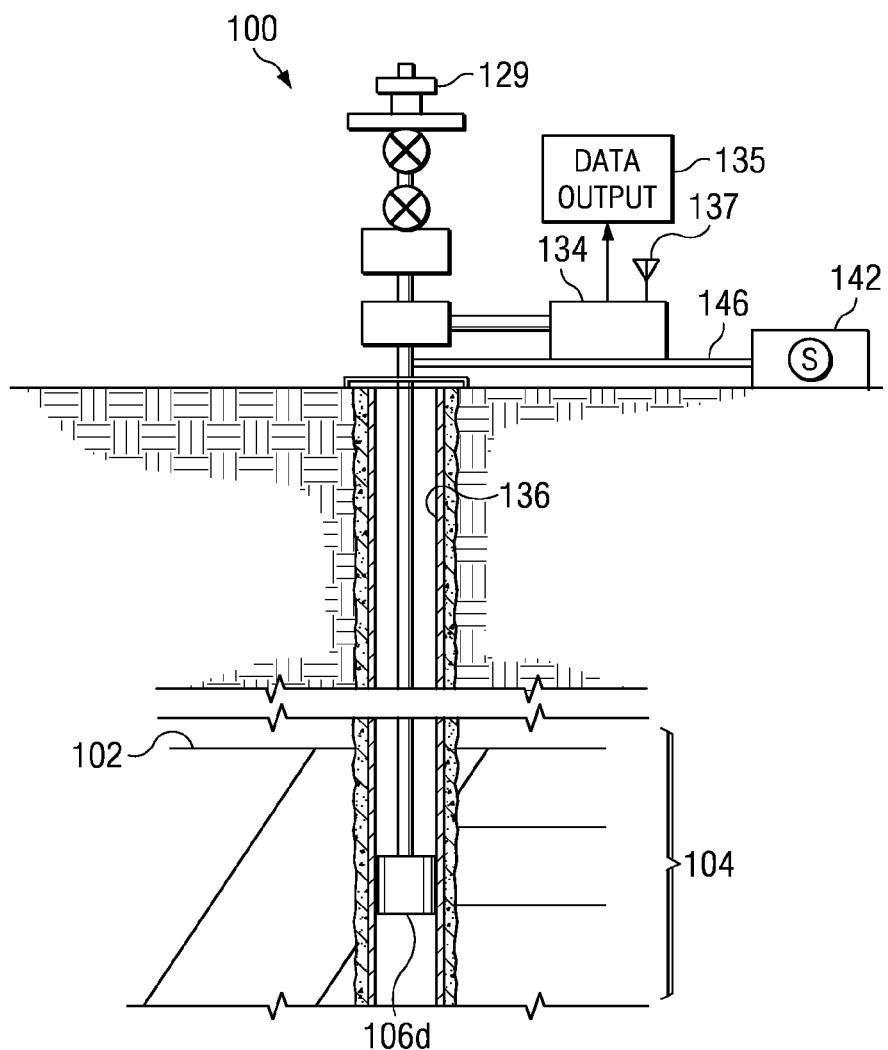

FIG. 1D depicts a production operation being performed by production tool 106*d* deployed from a production unit or Christmas tree 129 and into completed well bore 136 of FIG. 1C for drawing fluid from the downhole reservoirs into surface facilities 142. Fluid flows from reservoir 104 through perforations in the casing (not shown) and into production tool 106*d* in well bore 136 and to surface facilities 142 via a gathering network 146.

Sensors S, such as gauges, may be positioned about oilfield 100 to collect data relating to various oilfield operations as described previously. As shown, the sensor S may be positioned in production tool 106*d* or associated equipment, such as Christmas tree 129, gathering network 146, surface facility 142, and/or the production facility, to measure fluid parameters, such as fluid composition, flow rates, pressures, temperatures, and/or other parameters of the production operation.

While only simplified well site configurations are shown, it will be appreciated that the oilfield may cover a portion of land, sea, and/or water locations that hosts one or more well sites. Production may also include injection wells (not shown) for added recovery. One or more gathering facilities may be operatively connected to one or more of the well sites for selectively collecting downhole fluids from the well site(s).

While FIGS. 1B-1D depict tools used to measure properties of an oilfield, it will be appreciated that the tools may be used in connection with non-oilfield operations, such as mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors S may be located at various positions along the well bore and/or the monitoring tools to collect and/or monitor the desired data. Other sources of data may also be provided from offsite locations.

The oilfield configuration of FIGS. 1A-1D is intended to provide a brief description of an example of an oilfield usable with the present invention. Part, or all, of oilfield 100 may be on land, water, and/or sea. Also, while a single oilfield measured at a single location is depicted, the present invention may be utilized with any combination of one or more oilfields, one or more processing facilities and one or more well sites.

Figure 2A:
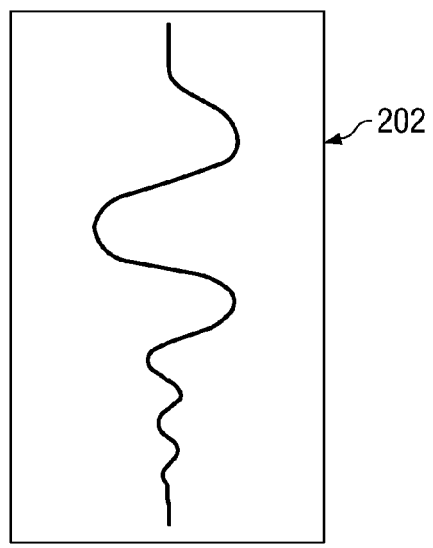
FIGS. 2A-2D are graphical depictions of examples of data collected by the tools of FIGS. 1A-1D, respectively.
Figure 2B:
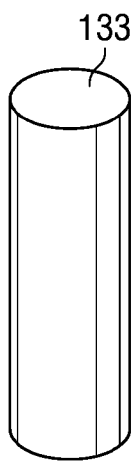
Figure 2C:
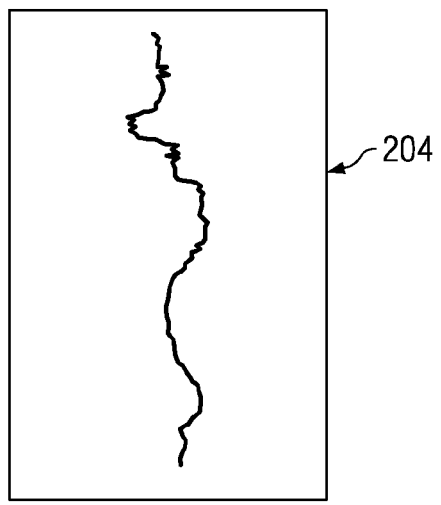
Figure 2D:
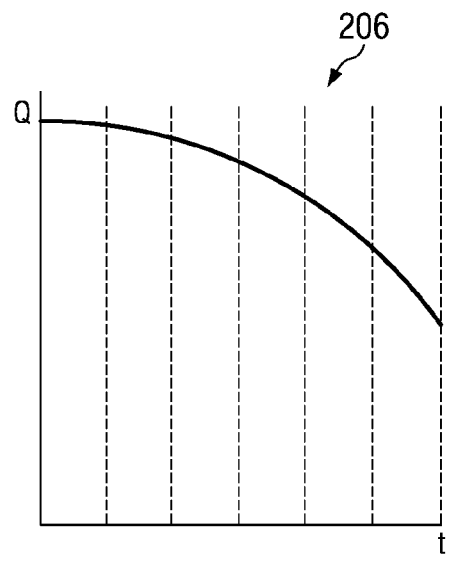

FIGS. 2A-2D are graphical depictions of examples of data collected by the tools of FIGS. 1A-1D, respectively. FIG. 2A depicts seismic trace 202 of the subterranean formation of FIG. 1A taken by seismic truck 106*a*. Seismic trace 202 may be used to provide data, such as a two-way response over a period of time. FIG. 2B depicts core sample 133 taken by drilling tools 106*b*. Core sample 133 may be used to provide data, such as a graph of the density, porosity, permeability, or other physical property of the core sample over the length of the core. Tests for density and viscosity may be performed on the fluids in the core at varying pressures and temperatures. FIG. 2C depicts well log 204 of the subterranean formation of FIG. 1C taken by wireline tool 106*c*. The wireline log typically provides a resistivity or other measurement of the formation at various depts. FIG. 2D depicts a production decline curve or graph 206 of fluid flowing through the subterranean formation of FIG. 1D measured at surface facilities 142. The production decline curve typically provides the production rate Q as a function of time t.

The respective graphs of FIGS. 2A-2C depict examples of static measurements that may describe or provide information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2D depicts an example of a dynamic measurement of the fluid properties through the well bore. As the fluid flows through the well bore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

Figure 3:
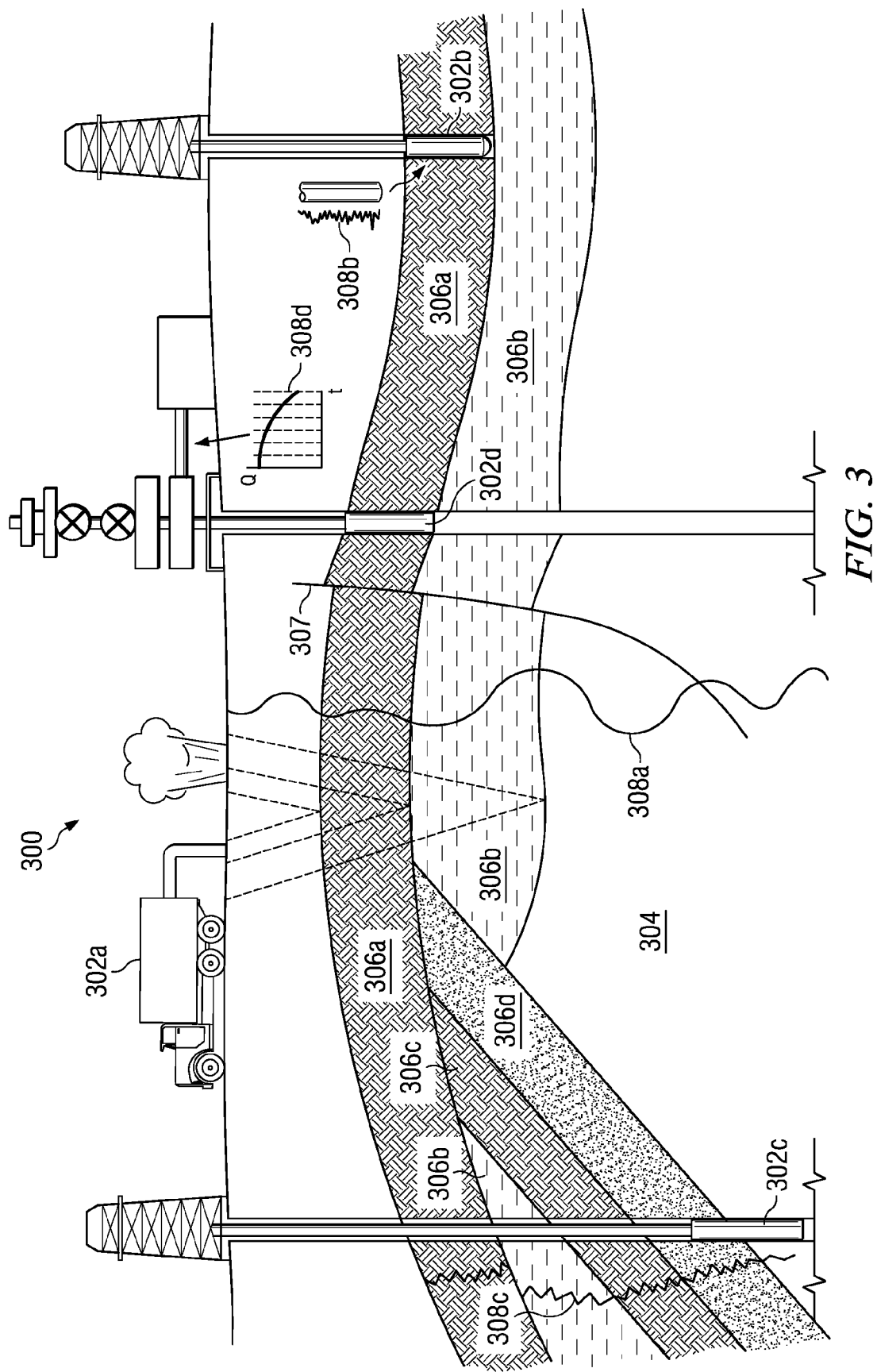
FIG. 3 is a schematic view, partially in cross section of an oilfield having data acquisition tools positioned at various locations along the oilfield for collecting data of the subterranean formation.

FIG. 3 is a schematic view, partially in cross section of oilfield 300 having data acquisition tools 302*a*, 302*b*, 302*c* and 302*d* positioned at various locations along the oilfield for collecting data of the subterranean formation 304. Data acquisition tools 302*a*-302*d* may be the same as data acquisition tools 106*a*-106*d* of FIGS. 1A-1D, respectively, or others not depicted. As shown, data acquisition tools 302*a*-302*d* generate data plots or measurements 308*a*-308*d*, respectively. These data plots are depicted along the oilfield to demonstrate the data generated by the various operations.

Data plots 308*a*-308*c* are examples of static data plots that may be generated by data acquisition tools 302*a*-302*d*, respectively. Static data plot 308*a* is a seismic two-way response time and may be the same as seismic trace 202 of FIG. 2A. Static plot 308*b* is core sample data measured from a core sample of formation 304, similar to core sample 133 of FIG. 2B. Static data plot 308*c* is a logging trace, similar to well log 204 of FIG. 2C. Production decline curve or graph 308*d* is a dynamic data plot of the fluid flow rate over time, similar to graph 206 of FIG. 2D. Other data may also be collected, such as historical data, user inputs, economic information, and/or other measurement data and other parameters of interest.

Subterranean structure 304 has a plurality of geological formations 306*a*-306*d*. As shown, this structure has several formations or layers, including shale layer 306*a*, carbonate layer 306*b*, shale layer 306*c* and sand layer 306*d*. Fault 307 extends through shale layer 306*a* and carbonate layer 306*b*. The static data acquisition tools are preferably adapted to take measurements and detect characteristics of the formations.

While a specific subterranean formation with specific geological structures is depicted, it will be appreciated that the oilfield may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield, it will be appreciated that one or more types of measurement may be taken at one or more locations across one or more oilfields or other locations for comparison and/or analysis.

The data collected from various sources, such as the data acquisition tools of FIG. 3, may then be processed and/or evaluated. Typically, seismic data displayed in static data plot 308a from data acquisition tool 302a is used by a geophysicist to determine characteristics of the subterranean formations and features. Core data shown in static plot 308b and/or log data from well log 308c are typically used by a geologist to determine various characteristics of the subterranean formation. Production data from graph 308d is typically used by the reservoir engineer to determine fluid flow reservoir characteristics. The data analyzed by the geologist, geophysicist and the reservoir engineer may be analyzed using modeling techniques. Examples of modeling techniques are described in U.S. Pat. No. 5,992,519, WO2004049216, WO1999/064896, U.S. Pat. No. 6,313,837, US2003/0216897, U.S. Pat. No. 7,248,259, US20050149307 and US2006/0197759. Systems for performing such modeling techniques are described, for example, in issued U.S. Pat. No. 7,248,259, the entire contents of which is hereby incorporated by reference.

Figure 4:
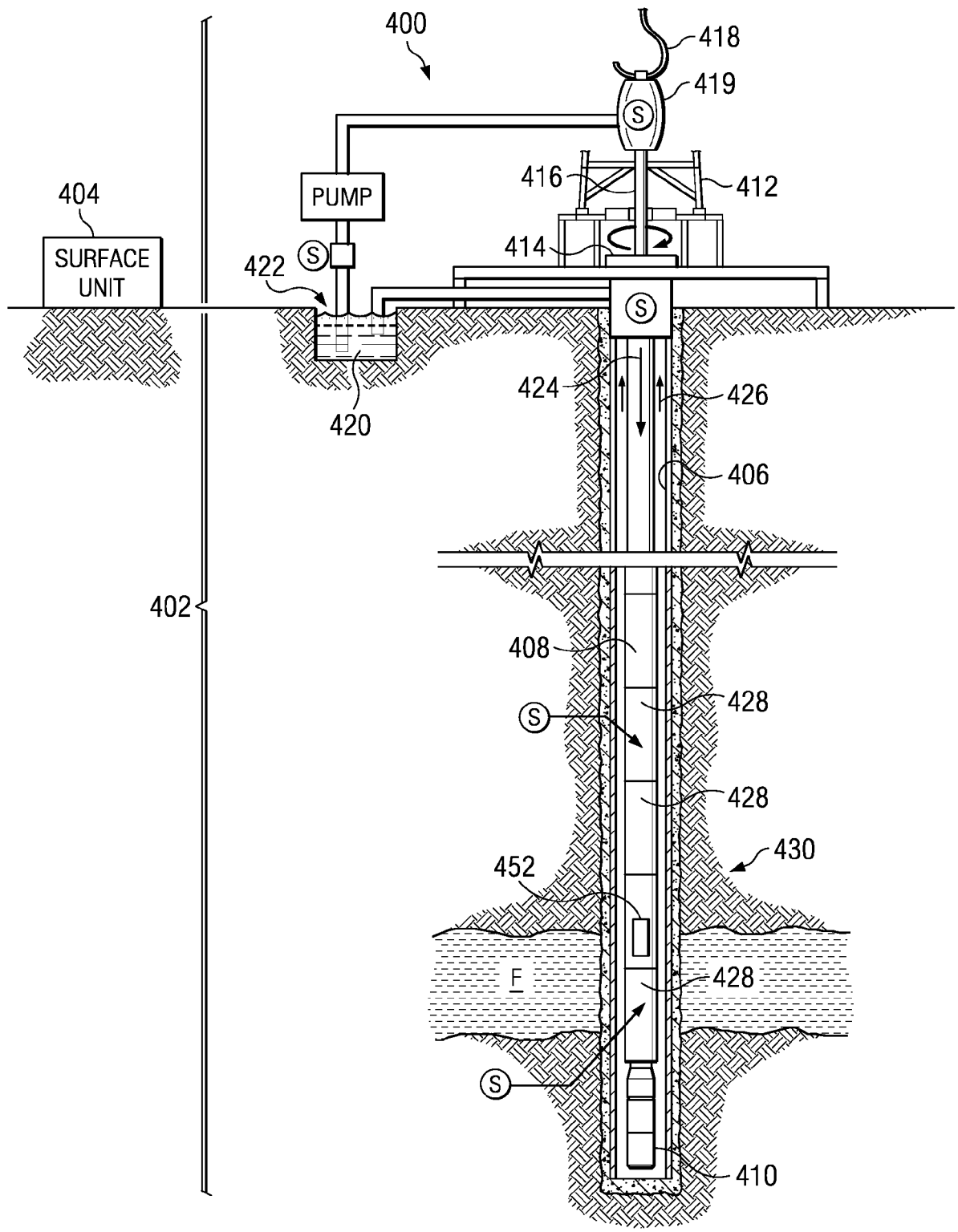
FIG. 4 is a schematic view of well site, depicting a drilling operation, such as the drilling operation of FIG. 1B, of an oilfield in detail.

FIG. 4 is a schematic view of well site 400, depicting a drilling operation, such as the drilling operation of FIG. 1B, of an oilfield in detail. Well site 400 includes drilling system 402 and surface unit 404. In the illustrated embodiment, borehole 406 is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs.

Drilling system 402 includes drill string 408 suspended within borehole 406 with drill bit 410 at its lower end. Drilling system 402 also includes the land-based platform and derrick assembly 412 positioned over borehole 406 penetrating subsurface formation F. Assembly 412 includes rotary table 414, kelly 416, hook 418, and rotary swivel 419. The drill string 408 is rotated by rotary table 414, energized by means not shown, which engages kelly 416 at the upper end of the drill string. Drill string 408 is suspended from hook 418, attached to a traveling block (also not shown), through kelly 416 and rotary swivel 419 which permits rotation of the drill string relative to the hook.

Drilling system 402 further includes drilling fluid or mud 420 stored in pit 422 formed at the well site. Pump 424 delivers drilling fluid 420 to the interior of drill string 408 via a port in swivel 419, inducing the drilling fluid to flow downwardly through drill string 408 as indicated by directional arrow 424. The drilling fluid exits drill string 408 via ports in drill bit 410, and then circulates upwardly through the region between the outside of drill string 408 and the wall of borehole 406, called annulus 426. In this manner, drilling fluid lubricates drill bit 410 and carries formation cuttings up to the surface as it is returned to pit 422 for recirculation.

Drill string 408 further includes bottom hole assembly (BHA) 430, generally referenced, near drill bit 410 (in other words, within several drill collar lengths from the drill bit). Bottom hole assembly 430 includes capabilities for measuring, processing, and storing information, as well as communicating with surface unit 404. Bottom hole assembly 430 further includes drill collars 428 for performing various other measurement functions.

Sensors S are located about well site 400 to collect data, preferably in real time, concerning the operation of well site 400, as well as conditions at well site 400. Sensors S of FIG. 3 may be the same as sensors S of FIGS. 1A-D. Sensors S of FIG. 3 may also have features or capabilities, of monitors, such as cameras (not shown), to provide pictures of the operation. Sensors S, which may include surface sensors or gauges, may be deployed about the surface systems to provide information about surface unit 404, such as standpipe pressure, hookload, depth, surface torque, rotary rpm, among others. In addition, sensors S, which include downhole sensors or gauges, are disposed about the drilling tool and/or well bore to provide information about downhole conditions, such as well bore pressure, weight on bit, torque on bit, direction, inclination, collar rpm, tool temperature, annular temperature and toolface, among others. The information collected by the sensors and cameras is conveyed to the various parts of the drilling system and/or the surface control unit.

Drilling system 402 is operatively connected to surface unit 404 for communication therewith. Bottom hole assembly 430 is provided with communication subassembly 452 that communicates with surface unit 404. Communication subassembly 452 is adapted to send signals to and receive signals from the surface using mud pulse telemetry. Communication subassembly 452 may include, for example, a transmitter that generates a signal, such as an acoustic or electromagnetic signal, which is representative of the measured drilling parameters. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic or other known telemetry systems.

Typically, the well bore is drilled according to a drilling plan that is established prior to drilling. The drilling plan typically sets forth equipment, pressures, trajectories and/or other parameters that define the drilling process for the well site. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

Figure 5:
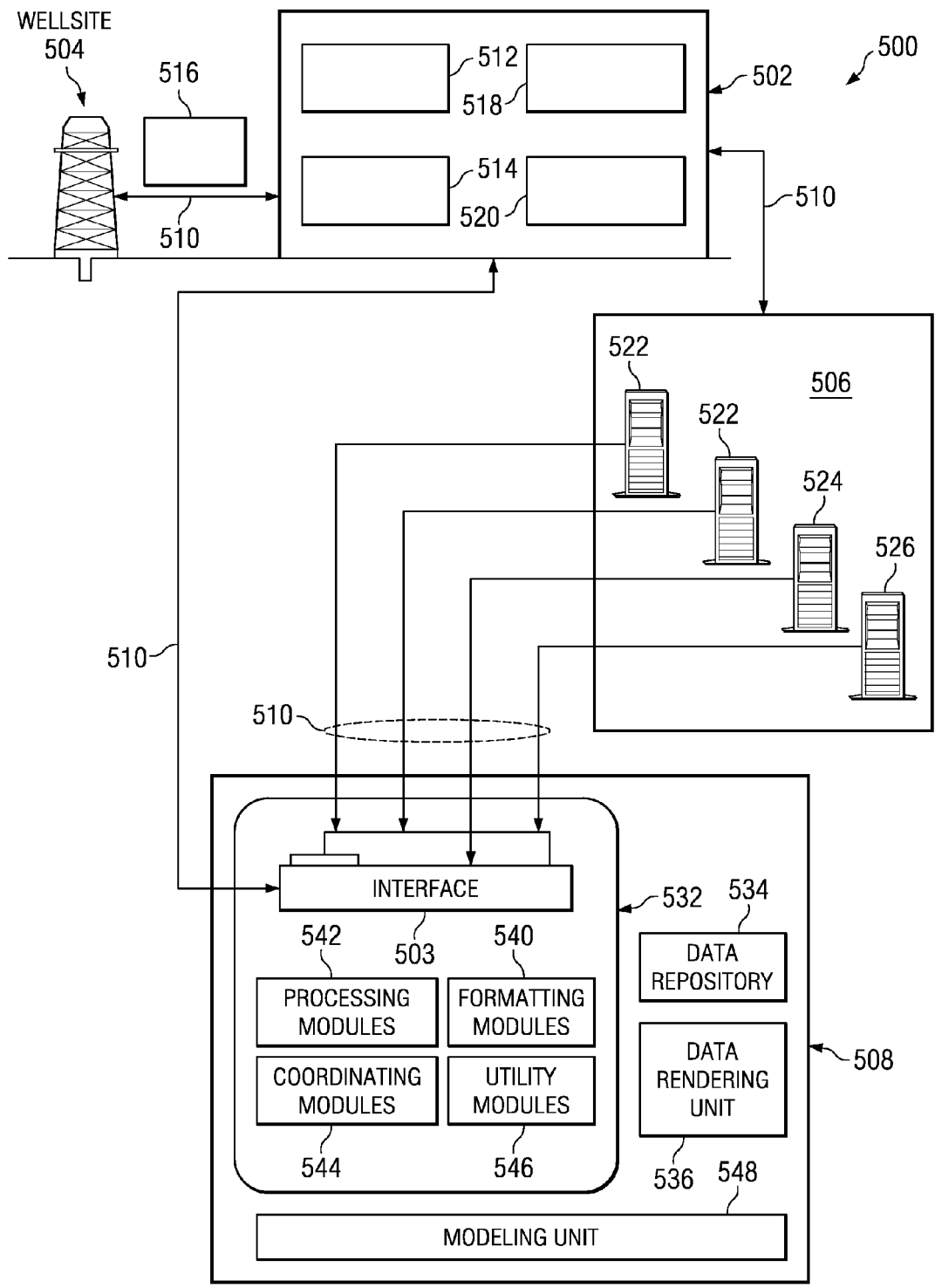
FIG. 5 is a schematic view of a system for performing a drilling operation of an oilfield.

FIG. 5 is a schematic view of system 500 for performing a drilling operation of an oilfield. As shown, system 500 includes surface unit 502 operatively connected to well site 504, servers 506 operatively linked to surface unit 502, and modeling tool 508 operatively linked to servers 506. As shown, communication links 510 are provided between well site 504, surface unit 502, servers 506, and modeling tool 508. A variety of links may be provided to facilitate the flow of data through the system. The communication links may provide for continuous, intermittent, one-way, two-way, and/or selective communication throughout system 500. The communication links may be of any type, such as wired, wireless, etc.

Well site 504 and surface unit 502 may be the same as the well site and surface unit of FIG. 3. Surface unit 502 is preferably provided with an acquisition component 512, controller 514, display unit 516, processor 518 and transceiver 520. Acquisition component 512 collects and/or stores data of the oilfield. This data may be data measured by the sensors S of the well site as described with respect to FIG. 3. This data may also be data received from other sources.

Controller 514 is enabled to enact commands at oilfield 500. Controller 514 may be provided with actuation means that can perform drilling operations, such as steering, advancing, or otherwise taking action at the well site. Drilling operations may also include, for example, acquiring and analyzing oilfield data, modeling oilfield data, managing existing oilfields, identifying production parameters, maintenance activities, or any other actions. Commands may be generated based on logic of processor 518, or by commands received from other sources. Processor 518 is preferably provided with features for manipulating and analyzing the data. The processor may be provided with additional functionality to perform oilfield operations.

Display unit 516 may be provided at well site 504 and/or remote locations for viewing oilfield data. The oilfield data displayed may be raw data, processed data, and/or data outputs generated from various data. The display is preferably adapted to provide flexible views of the data, so that the screens depicted may be customized as desired.

Transceiver 520 provides a means for providing data access to and/or from other sources. Transceiver 520 also provides a means for communicating with other components, such as servers 506, well site 504, surface unit 502, and/or modeling tool 508.

Server 506 may be used to transfer data from one or more well sites to modeling tool 508. As shown, server 506 includes onsite servers 522, remote server 524, and third party server 526. Onsite servers 522 may be positioned at well site 504 and/or other locations for distributing data from surface unit 502. Remote server 524 is positioned at a location away from oilfield 504 and provides data from remote sources. Third party server 526 may be onsite or remote, but is operated by a third party, such as a client.

Servers 506 are preferably capable of transferring drilling data, such as logs, drilling events, trajectory, and/or other oilfield data, such as seismic data, historical data, economics data, or other data that may be of use during analysis. The type of server is not intended to limit the invention. Preferably system 500 is adapted to function with any type of server that may be employed.

Servers 506 communicate with modeling tool 508 as indicated by communication links 510 there between. As indicated by the multiple arrows, servers 506 may have separate communication links with modeling tool 508. One or more of the servers of servers 506 may be combined or linked to provide a combined communication link.

Servers 506 collect a wide variety of data. The data may be collected from a variety of channels that provide a certain type of data, such as well logs. The data from servers 506 is passed to modeling tool 508 for processing. Servers 506 may be used to store and/or transfer data.

Modeling tool 508 is operatively linked to surface unit 502 for receiving data therefrom. In some cases, modeling tool 508 and/or server(s) 506 may be positioned at well site 504. Modeling tool 508 and/or server(s) 506 may also be positioned at various locations. Modeling tool 508 may be operatively linked to surface unit 502 via server(s) 506. Modeling tool 508 may also be included in or located near surface unit 502.

Modeling tool 508 includes interface 503, processing unit 532, modeling unit 548, data repository 534 and data rendering unit 536. Interface 503 communicates with other components, such as servers 506. Interface 503 may also permit communication with other oilfield or non-oilfield sources. Interface 503 receives the data and maps the data for processing. Data from servers 506 typically streams along predefined channels which may be selected by interface 503.

As depicted in FIG. 5, interface 503 selects the data channel of server(s) 506 and receives the data. Interface 503 also maps the data channels to data from well site 504. The data may then be passed to the processing unit of modeling tool 508. Preferably, the data is immediately incorporated into modeling tool 508 for real-time sessions or modeling. Interface 503 creates data requests (for example surveys, logs, and risks), displays the user interface, and handles connection state events. It also instantiates the data into a data object for processing.

Processing unit 532 includes formatting modules 540, processing modules 542, coordinating modules 544, and utility modules 546. These modules are designed to manipulate the oilfield data for real-time analysis.

Formatting modules 540 are used to conform data to a desired format for processing. Incoming data may need to be formatted, translated, converted or otherwise manipulated for use. Formatting modules 540 are configured to enable the data from a variety of sources to be formatted and used so that it processes and displays in real time.

As shown, formatting modules 540 include components for formatting the data, such as a unit converter and the mapping components. The unit converter converts individual data points received from interface 530 into the format expected for processing. The format may be defined for specific units, provide a conversion factor for converting to the desired units, or allow the units and/or conversion factor to be defined. To facilitate processing, the conversions may be suppressed for desired units.

The mapping component maps data according to a given type or classification, such as a certain unit, log mnemonics, precision, max/min of color table settings, etc. The type for a given set of data may be assigned, particularly when the type is unknown. The assigned type and corresponding map for the data may be stored in a file (e.g. XML) and recalled for future unknown data types.

Coordinating modules 544 orchestrate the data flow throughout modeling tool 508. The data is manipulated so that it flows according to a choreographed plan. The data may be queued and synchronized so that it processes according to a timer and/or a given queue size. The coordinating modules include the queuing components, the synchronization components, the management component, modeling tool 508 mediator component, the settings component and the real-time handling component.

The queuing module groups the data in a queue for processing through the system. The system of queues provides a certain amount of data at a given time so that it may be processed in real time.

The synchronization component links certain data together so that collections of different kinds of data may be stored and visualized in modeling tool 508 concurrently. In this manner, certain disparate or similar pieces of data may be choreographed so that they link with other data as it flows through the system. The synchronization component provides the ability to selectively synchronize certain data for processing. For example, log data may be synchronized with trajectory data. Where log samples have a depth that extends beyond the well bore, the samples may be displayed on the canvas using a tangential projection so that, when the actual trajectory data is available, the log samples will be repositioned along the well bore. Alternatively, incoming log samples that are not on the trajectory may be cached so that, when the trajectory data is available, the data samples may be displayed. In cases where the log sample cache fills up before the trajectory data is received, the samples may be committed and displayed.

The settings component defines the settings for the interface. The settings component may be set to a desired format and adjusted as necessary. The format may be saved, for example, in an extensible markup language (XML) file for future use.

The real-time handling component instantiates and displays the interface and handles its events. The real-time handling component also creates the appropriate requests for channel or channel types, and handles the saving and restoring of the interface state when a set of data or its outputs is saved or loaded.

The management component implements the required interfaces to allow the module to be initialized by and integrated for processing. The mediator component receives the data from the interface. The mediator caches the data and combines the data with other data as necessary. For example, incoming data relating to trajectories, risks, and logs may be added to wellbores stored in modeling tool 508. The mediator may also merge data, such as survey and log data.

Utility modules 546 provide support functions to the drilling system. Utility modules 546 include the logging component and the user interface (UI) manager component. The logging component provides a common call for all logging data. This module allows the logging destination to be set by the application. The logging module may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The user interface manager component creates user interface elements for displays. The user interface manager component defines user input screens, such as menu items, context menus, toolbars, and settings windows. The user manager may also be used to handle events relating to these user input screens.

Processing module 542 is used to analyze the data and generate outputs. Processing module 542 includes the trajectory management component.

The trajectory management component handles the case when the incoming trajectory information indicates a special situation or requires special handling. The trajectory management component could therefore handle situations where the data pertains to depths that are not strictly increasing or the data indicates that a sidetrack borehole path is being created. For example, when a sample is received with a measured depth shallower than the hole depth, the trajectory module determines how to process the data. The trajectory module may ignore all incoming survey points until the MD exceeds the previous MD on the well bore path, merge all incoming survey points below a specified depth with the existing samples on the trajectory, ignore points above a given depth, delete the existing trajectory data and replace it with a new survey that starts with the incoming survey station, create a new well and set its trajectory to the incoming data, add incoming data to this new well, and prompt the user for each invalid point. All of these options may be exercised in combinations and can be automated or set manually.

Data repository 534 stores the data for modeling unit 548. The data is preferably stored in a format available for use in real-time. The data is passed to data repository 534 from the processing component. It can be persisted in the file system (e.g., as an XML File) or in a database. The system determines which storage is the most appropriate to use for a given piece of data and stores the data there in a manner which enables automatic flow of the data through the rest of the system in a seamless and integrated fashion. It also facilitates manual and automated workflows—such as modeling, geological, and geophysical—based upon the persisted data.

Data rendering unit 536 provides one or more displays for visualizing the data. Data rendering unit 536 may contain a 3D canvas, a well section canvas or other canvases as desired. Data rendering unit 536 may selectively display any combination of one or more canvases. The canvases may or may not be synchronized with each other during display. The display unit is preferably provided with mechanisms for actuating various canvases or other functions in the system.

While specific components are depicted and/or described for use in the modules of modeling tool 508, it will be appreciated that a variety of components with various functions may be used to provide the formatting, processing, utility, and coordination functions necessary to provide real-time processing in modeling tool 508. The components and/or modules may have combined functionalities.

Modeling unit 548 performs the key modeling functions for generating complex oilfield outputs. Modeling unit 548 may be a conventional modeling tool capable of performing modeling functions, such as generating, analyzing, and manipulating earth models. The earth models typically contain exploration and production data, such as that shown in FIG. 1. In the following detailed description of the preferred embodiments and other embodiments of the invention, reference is made to the accompanying drawings. It is to be understood that those of skill in the art will readily see other embodiments and changes may be made without departing from the scope of the invention.

Figure 6:
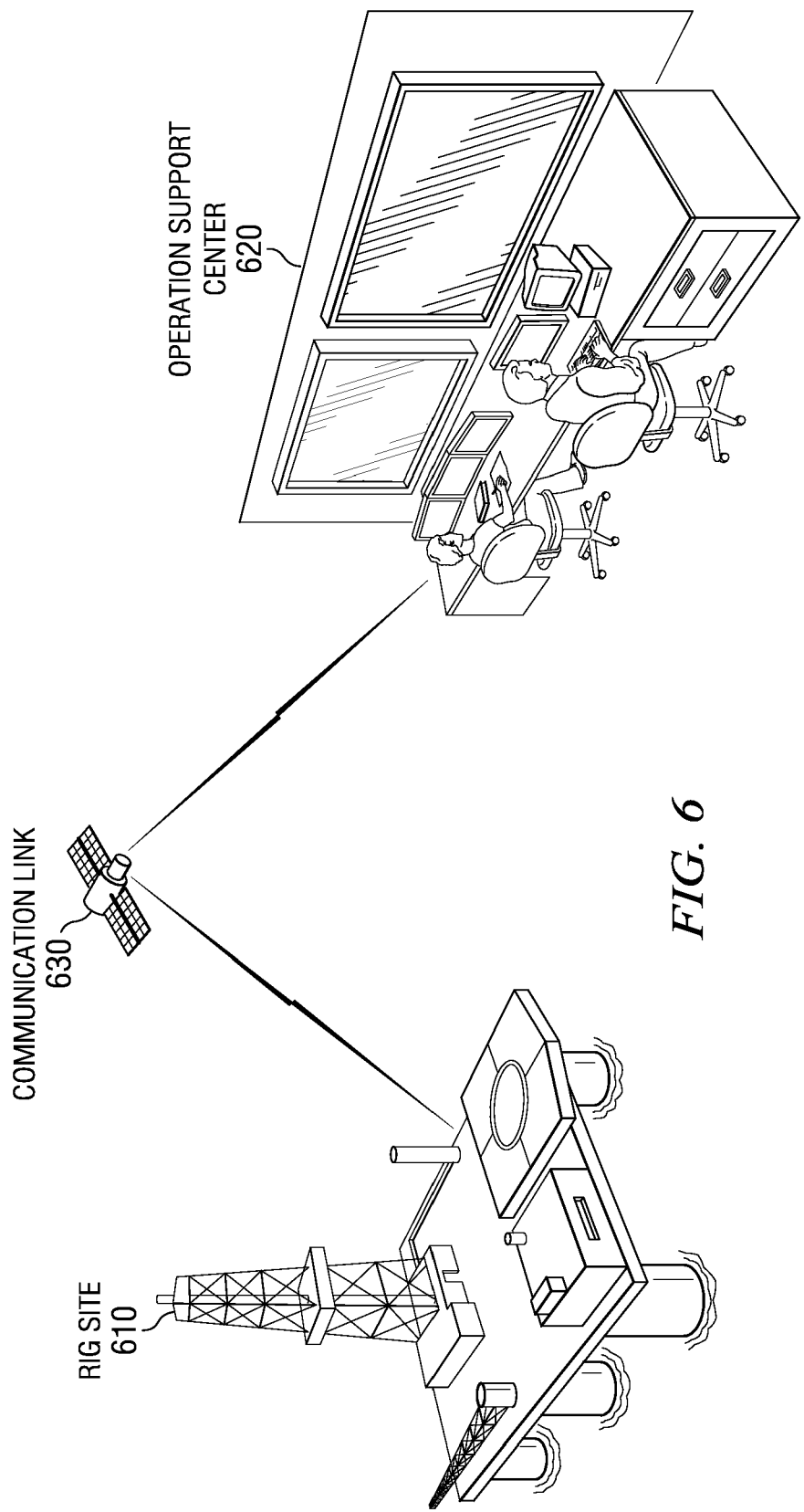
FIG. 6 is an example of an oil well construction and/or drilling project where remote operations support according to the prior art.

FIG. 6 illustrates an example of an oil well construction and/or drilling project where remote operations support is provided according to the prior art. Rig site 610 is a well site, such as well site 400 of FIG. 4, and can be an offshore well site. Collection of various types of data and site-specific decisions occur at rig site 610. To perform these data collection and decision making activities, certain members of a project team are located at rig site 610.

Operation support center 620 is generally remotely located from rig site 610. Other project team members at Operation support center 620 provide operations support from, including but not limited to, monitoring, providing technical analysis, and making strategic decisions affecting the overall drilling process that is occurring at rig site 610.

Communication link 630 provides communication and data transfer between rig site 610 and operation support center 620. Communication and data transfer provided by communication link 630 between rig site 610 and operation support center 620 are typically implemented through a standard wired and/or wireless communication link, which can be, but is not limited to a satellite link.

The different illustrative embodiments recognize that in the arrangement of FIG. 6, team members at rig site 610 and team members at operation support center 620 are disparately located, but need to be able to collaborate closely and work together efficiently, particularly in high-technology development projects. However, applying conventional information technology infrastructure to oil well construction and/or drilling projects can pose special problems that do not otherwise occur or are less significant in a typical office environment. Further complications arise as additional measurements are acquired (particularly surface measurements) and predictive models are increasingly used together with more complete monitoring of rig activities, a higher degree of rig automation, fewer people on site, and greater remote support from both service companies and oil company sites. The different illustrative embodiments recognize that the infrastructure provided in FIG. 6 is therefore unable to provide the required infrastructure for facilitating efficient sharing of data between project team members in oil well construction and/or drilling projects.

Figure 7:
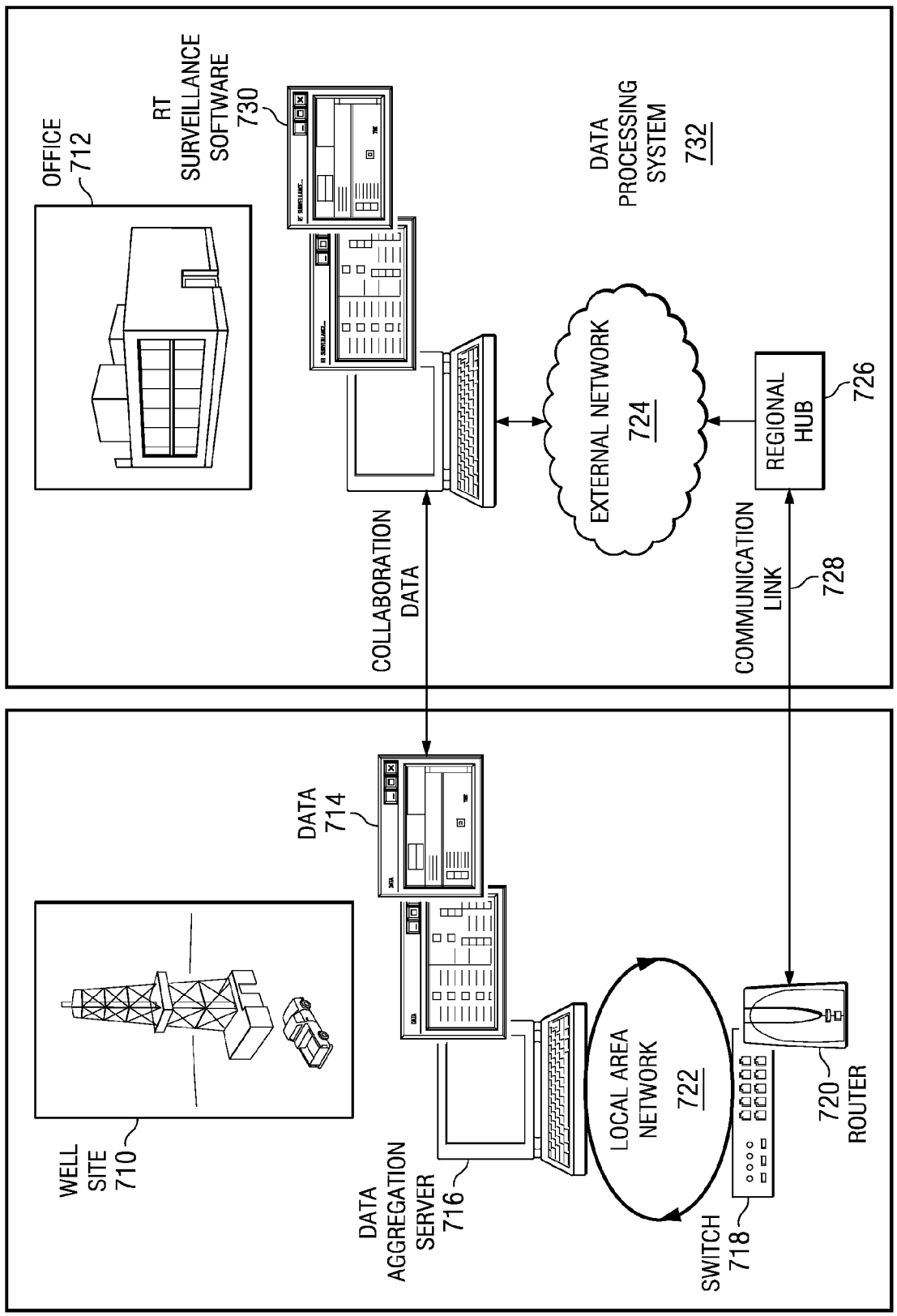
FIG. 7 is a general layout for an oil well construction and/or drilling collaboration infrastructure as shown according to an illustrative embodiment.

Referring now to FIG. 7, a general layout for an oil well construction and/or drilling collaboration infrastructure is shown according to an illustrative embodiment. The infrastructure of FIG. 7 connects project team members at well site 710, which can be well site 400 of FIG. 4, with project team members at office 712. Office 712 is a location remotely located from well site 710. Office 712 can be an actual office structure; however, office 712 is not limited to such a structure. Office 712 can be any location remote from well site 710 capable of providing operations support for a drilling process that is occurring at well site 710. The operations support can include, but is not limited to, monitoring, providing technical analysis, and making strategic decisions affecting the overall drilling process that is occurring at well site 710.

The infrastructure of FIG. 7 allows the project team members at well site 710 two groups to communicate and exchange data with the project team members at office 712. Data 714 is collected from multiple vendors at the well site 710 by using data aggregation server 716 that securely stores the data. Data 714 can include, but is not limited to mud logging data, logging-while-drilling data, monitoring-while-drilling data, rig sensor data, and other data that can be collected at a well site. Data aggregation server 716, which may include multiple servers to form a set of data aggregation servers, is connected to a switch 718 and router 720. Together, switch 718 and router 720 provide a network for collecting and accessing the data at well site 710. The network provided by switch 718 and router 720 may be any suitable network known to those having ordinary skill in the art, and can include a wired or wireless local area network 722. Local area network 722 is, in turn, connected to an external network 724, such as the Internet via communication link 728, which can be a satellite link. Regional hub 726 can provide a communication link between various well sites. Project team members at office 712 may then connect to data aggregation server 716 over external network 724 to access data 714 on data aggregation server 716.

Office 712 can include an operation support center, such as operation support center 620 of FIG. 6. The operation support center may be set up in a predefined area at Office 712 to provide space and computing equipment for project team members to work. Project team members at office 712 conduct various activities at the operations support center in support of the project team members at well site 710.

In a typical arrangement, surveillance engineers at office 712 are provided with real-time surveillance of various activities taking place at well site 710. The surveillance may be conducted using real-time surveillance software 730 running on data processing system 732 at the operations support center of office 712 and at well site 710. The collaboration infrastructure facilities shown in FIG. 7 allow for closer collaboration between the project team members at well site 710 and the project team members at office 712.

Figure 8:
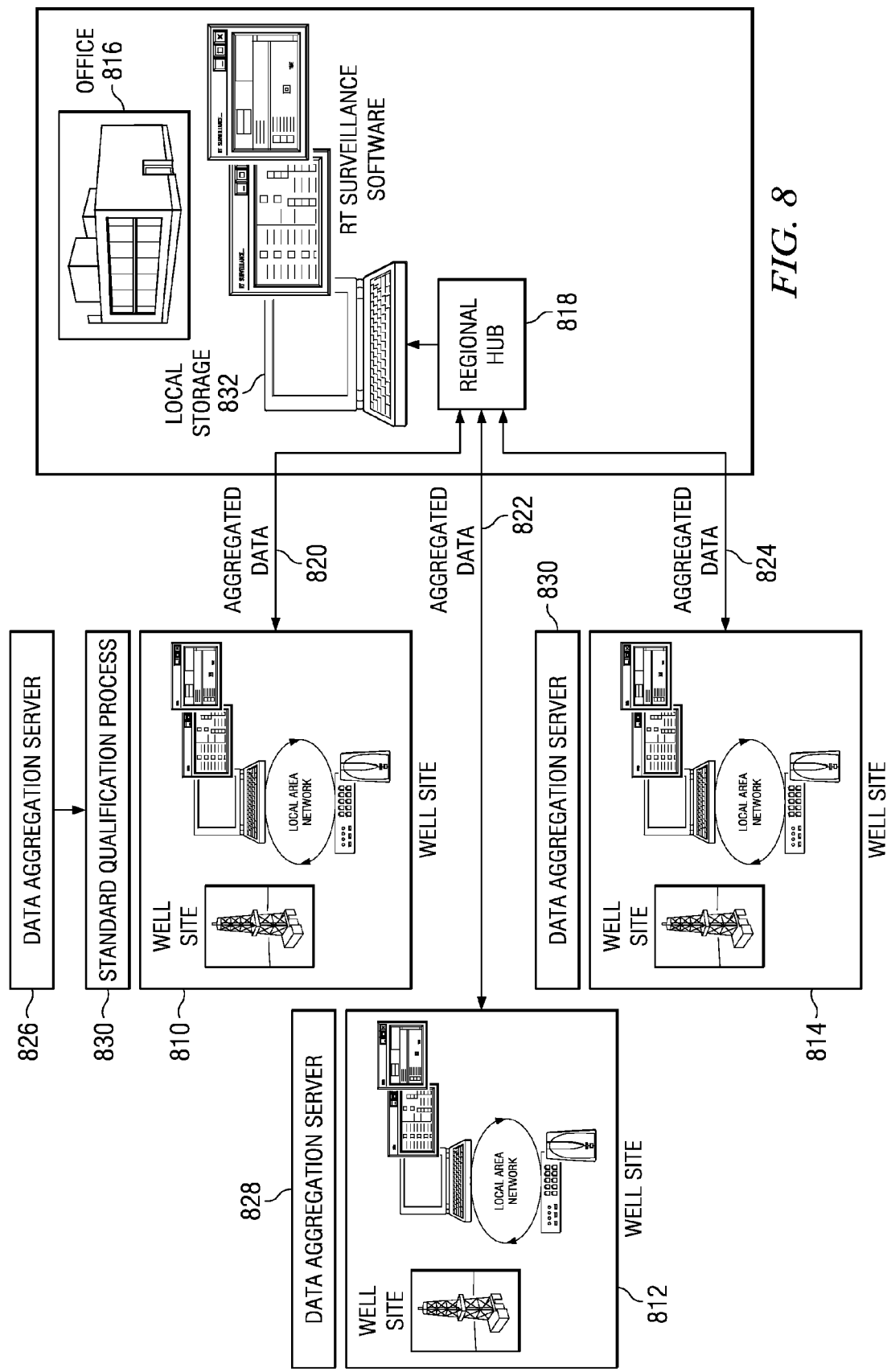
FIG. 8 is a general layout for multiple rig collaboration according to an illustrative embodiment.

Referring now to FIG. 8, a general layout for multiple rig collaboration infrastructures is shown according to an illustrative embodiment. Well sites 810, 812, and 814 can be a well site such as well site 710 of FIG. 7. The replication of collaboration infrastructures at multiple rigs in a given oilfield allows multiple well sites to be remotely supported from a single operations support center, such as the operation support center at office 712 of FIG. 7. Project team members at the various well sites 810, 812, and 814 may then work together using the collaboration infrastructure to manage the overall drilling process for an entire oilfield asset, thereby providing huge potential increases in efficiency across the entire asset.

The collaboration infrastructure methods, systems, and apparatuses of the illustrative embodiment may be used regardless of whether the wells are being drilled in a high-volume, low-cost land environment or a high-cost, low-volume offshore environment. While drilling projects are typically is part of a multi-location "virtual" team, the illustrative collaboration infrastructure facilitates cooperation between the various personnel involved, including an asset management team in office 816, a company man on a rig at well sites 810, 812, and 814, rig contractors and other vendors on the rig at well sites 810, 812, and 814, and engineers and support personnel located at both locations. In preferred embodiments, the collaboration infrastructure communicates between well sites 810, 812, and 814 and office 816 via regional hub 818, which can be regional hub 726 of FIG. 7. The collaboration infrastructure uses enterprise class components coupled with processes and support institutions commensurate with the challenges and difficulties of an oil well environment.

In general, the collaboration infrastructure methods, systems, and apparatuses of the illustrative embodiment provide a secure, hosted, managed solution with efficient global data access and backup and recovery services for all data.

The collaboration infrastructure at the rig at well sites 810, 812, and 814, aggregates data from a variety of information sources into aggregated data 820, 822, and 824. These sources can include, but are not limited to, information from a rig contractor, mud logger data, measurements-while-drilling data, logging-while-drilling data, information received from a company man, data from pore pressure monitoring, drilling optimization information, and episodic data, such as including wireline data, cementing data, and drill-string testing data.

The collaboration infrastructure also preferably provides real-time access to aggregated data 820, 822, and 824 by the collaboration team regardless of their location at either well sites 810, 812, and 814 or office 816. Aggregated data 820, 822, and 824 can be accessed in real-time by processes such as web-based viewers, interactive viewers, import to analysis applications, and handheld access.

The collaboration infrastructure can also facilitate communication between collaboration team members at similar or identical sites, such as between rig team members of a single well site, such as one of well sites 810, 812, and 814. The collaboration infrastructure, therefore, can provide a number of application and/or functions, such as, for example, electronic chat applications, instant message applications, shared data analysis, fax, reporting, email, and voice over internet protocol communication. The collaboration infrastructure can additionally provide other applications such as, but not limited to, wired and/or wireless local area networks, video monitoring, facsimile receipt and transmission, private network access, links to sub networks, hazardous area and other real-time displays, integration of personal digital assistants, remote administration, and remote monitoring and support.

The collaboration infrastructure also provides various security features to limit access to aggregated data 820, 822, and 824. The various security features in one illustrative embodiment can include, but are not limited to, a firewall, a security patch management, personalized access control, hazardous area certification, bandwidth allocation and Quality of Service (QoS), and the ability to track malicious activity.

At office 816, the collaboration infrastructure of FIG. 8 preferably provides flexible deployment internal and external to a corporate network (i.e., hosted), ease of integration with existing company infrastructure, access to multiple rigs at well sites 810, 812, and 814 as required, sufficient viewing area and real-time displays, rapid assimilation of aggregated data 820, 822, and 824, and ease of context switching. The collaboration infrastructure of FIG. 8 also preferably provides real-time access to aggregated data 820, 822, and 824 by the remote team at office 816. Real-time access to aggregated data 820, 822, and 824 can include, but is not limited to, web-based viewers, interactive viewers, import to analysis applications, and handheld access. Inter-communication between remote team members at office 816 is also preferably provided, including chat, instant messaging, shared data analysis, facsimile, reporting, email, and voice-over-internet protocol communication. Other services provided by the collaboration infrastructure may include wired and/or wireless local area networks, video monitoring, Personal Digital Assistants, Flexible Administration (Remote/Local), and Flexible Monitoring and Support (Remote/Local). As for security, the collaboration infrastructure preferably provides a firewall, security patch management, access control, hazardous area certification, bandwidth allocation and Quality of Service (QoS), and can easily conform to client environment.

Many of the above features can be delivered using small office/home office (SOHO) equipment with very little management or configuration. However, in order to provide a secure, managed and extensible local area network that can provide the required features, the collaboration infrastructure methods, systems, and apparatuses of the illustrative embodiment, use enterprise class router and switch.

With respect to the aggregation of aggregated data 820, 822, and 824 and access to this at office 816, although there are many possible infrastructure solutions for data aggregation, one illustrative embodiment utilizes data aggregation servers 826, 828, and 830 on individual rigs at well sites 810, 812, and 814. Locating data aggregation servers 826, 828, and 830 on individual rigs at well sites 810, 812, and 814 provides benefits that outweigh most logistics issues. For example, data aggregation servers 826, 828, and 830 at the rig provide an interface to the various vendor systems on the rig and also provide local access to aggregated data 820. Locating data aggregation servers 826, 828, and 830 at the rig eliminates potential traffic across a communication link, such as communication link 728 of FIG. 7, from the rig to office 816. If the data aggregation servers 826, 828, and 830 were located remotely from the rig, such as at office 816, team members at well site 810 would have to access data aggregation servers 826, 828, and 830 through the via the relatively scarce and expensive bandwidth of the communication link, such as communication link 728 of FIG. 7.

Data aggregation servers 826, 828, and 830 aggregate data together to create aggregated data 820 in a way that aggregated data 820 can be viewed and analyzed using a consistent set of tools. That is, aggregated data 820 is not limited strictly to the native tools and software environments provided by the various vendors.

Data aggregation servers 826, 828, and 830 combine aggregated data 820, 822, 824 into a consistent and vendor neutral data delivery format. By using the data aggregation servers 826, 828, and 830 to aggregate the data into a standard repository with a standard set of analysis tools, the value of the data is immediately enhanced. Time that was previously spent analyzing data in the so that the data can be prepared and implemented into a usable format is eliminated. Therefore, all of the data collected on rigs at well sites 810, 812, and 814 can be utilized. With the different illustrative embodiments, data is not simply eliminated because of the complexity of learning the different tools from each vendor or for each data type.

By limiting the transmission of aggregated data 820, 822, and 824, the load across communication link, such as communication link 728 of FIG. 7, can be reduced. For example, if aggregated data 820, 822, and 824 is strictly collected at the rig and stored locally at well sites 810, 812, and 814, then remote users at office 816 are forced to access aggregated data 820, 822, and 824 through the high latency and potentially scarce bandwidth of the satellite connection to the rig, such as communication link 728 of FIG. 7. By contrast, if aggregated data 820, 822, and 824 is only stored onshore, such as at office 816, users on rigs at well sites 810, 812, and 814 must retrieve aggregated data 820, 822, and 824 from the onshore location in order to use it effectively.

Locating the data aggregation servers 826, 828, and 830 on a rig at well sites 810, 812, and 814 allows for controlled and facilitated access to aggregated data 820, 822, and 824. In one illustrative embodiment, data to form aggregated data 820, 822, and 824 may be collected into the data aggregation server at the rig and transmitted to the remote team at office 816 only once, to be stored at local storage 832. Users at a rig at one of well sites 810, 812, and 814 may access aggregated data 820 in real time locally on data aggregation server 826 and users onshore may access aggregated data 820 from local storage 832 at office 816, thus minimizing the traffic over the satellite communication link, such as communication link 728 of FIG. 7, or other rig connectivity. Local storage 832 is a data storage medium that locally mirrors data that is stored at data aggregation server 826. Local storage 832 can be any persistent or non-persistent type storage, such as for example, but not limited to, magnetic memory such as hard disk drives, removable disks, optical storage, such as CD-ROMs and DVD-ROMs, as well as semiconductor type storage, such as random access memory chips, read only memory chips, and flash memory. This bifurcated storage of aggregated data 820 helps eliminate contention for connectivity and bandwidth between office 816 and well sites 810, 812, and 814.

Combining data from well sites 810, 812, and 814 into aggregated data 820, 822, and 824 requires collecting data from a variety of vendors and systems and using various data sharing standards available for rigs. In one illustrative embodiment, the data collaboration infrastructure of FIG. 8 acquires data in a standard data format. The standard data format can be, for example, but is not limited to, the Wellsite Information Transfer Standard (WITS) format, the WITSML format, or the markup language based evolution of the Wellsite Information Transfer Standard format.

In one illustrative embodiment, data aggregation server 826 includes a standard qualification process 830 for new vendors. Standard qualification process 830 is a software process that maps previously collected sample Wellsite Information Transfer Standard data with associated data descriptions. Once data is mapped, the mapped data is stored in a knowledge base so that data from that vendor may be acquired and comprehended anywhere. Mapped data obtained from the standard qualification process 830 can be transferred between well sites 810, 812, 814 and office 816 to extend the comprehension of the acquired data.

Figure 9:
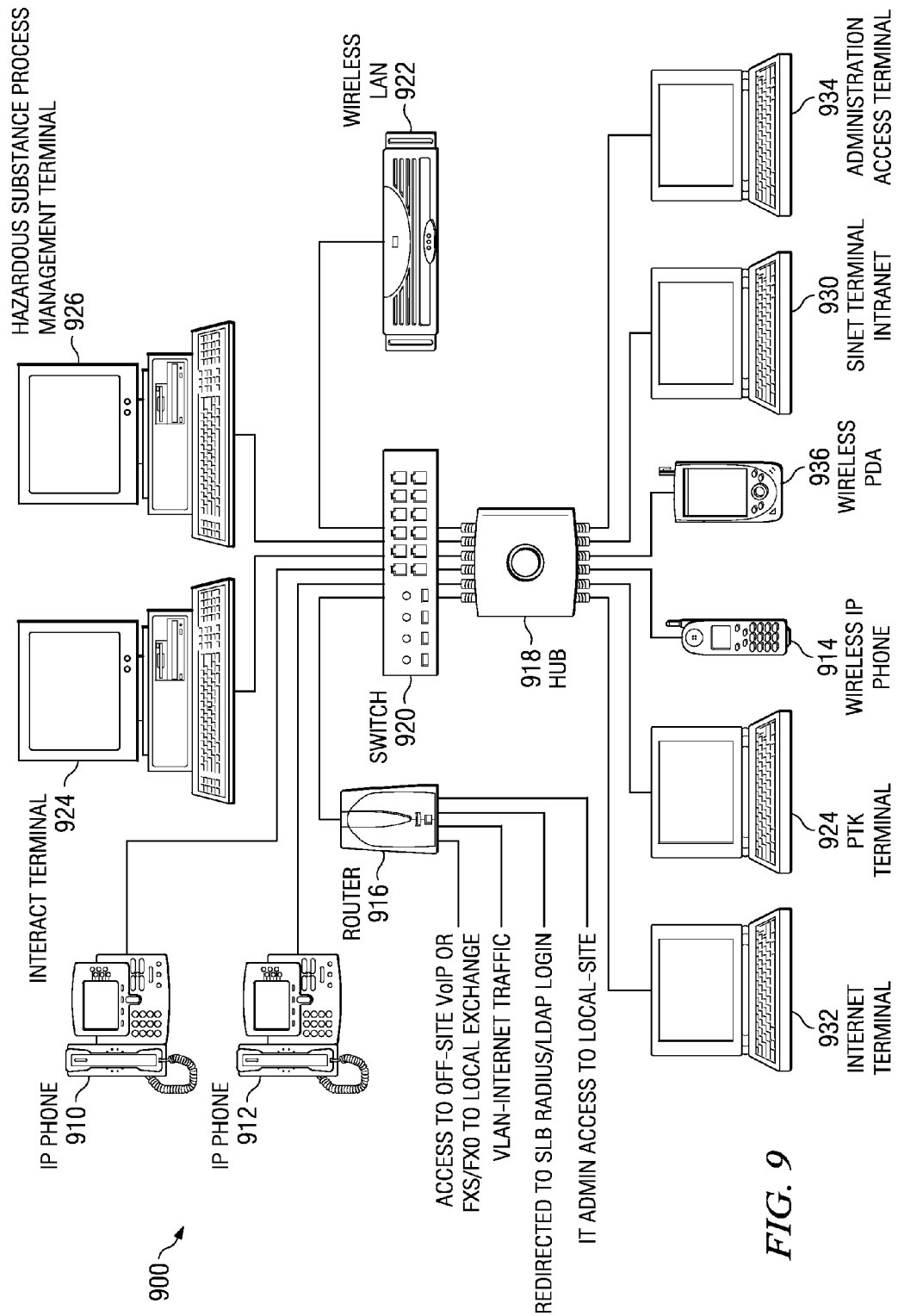
FIG. 9 is an exemplary network that may be used in a collaboration infrastructure according to an illustrative embodiment.

Referring now to FIG. 9, an exemplary network that may be used in a collaboration infrastructure is shown according to an illustrative embodiment. Network 900 of FIG. 9 is the network between the various components of the collaboration infrastructure of FIGS. 6-8.

Voice-over-internet protocol is enabled by wired internet protocol telephones 910-912 and wireless internet protocol telephone 914. Internet protocol telephones 910-912 connect to enterprise class router 916. Enterprise class router 916 provides access from internet protocol telephones 910-912, and other networked devices, to off-site voice over internet protocol telephone servers. Enterprise class router 916 can also provide access to a foreign exchange service, a foreign exchange office, or a local exchange in order to enable telephone communication to the rig. Wireless internet protocol telephone 914 wirelessly connects to hub 918. Hub 918 is connected to enterprise class switch 920. Enterprise class switch 920 is connected to enterprise class router 916.

Enterprise class wireless local area network controller (local area network controller) 922 is also connected to enterprise class switch 920. Enterprise class wireless local area network controller 922 provides the rig with system-wide wireless local area network functions, such as for example, but not limited to, security policies, intrusion prevention, RF management, quality of service (QoS), and mobility. Users can wirelessly connect to the network of FIG. 9 through the use of wireless personal digital assistant 936, or through a wireless ethernet card installed into a data processing system.

The network of FIG. 9 can also connect with various terminals running proprietary or public software systems for monitoring of data from the well site, or predicting operations of the well site operations based on aggregated data. Terminals can also be provided for connecting to various public and private networks. These terminals can include, but are not limited to, InterACT™ terminal 924, Hazardous Substance Process Management terminal 926, PTK Local Viewer terminal 928, siNET terminal 930, and internet terminal 932. A site administrator can connect to the infrastructure using an administration access terminal 934.

In some embodiments, in order to access the data and services on the rig, access external connectivity, and use global resources to improve the performance of the team, users on the rig are segmented according to their requirements and access to resources are limited unless access is required and approved. This may be accomplished by categorizing users according to their requirements and permissions and then using virtual local area networks (VLANs) to accommodate and constrain each group. For example, one group of users may need access to data on the rig and other users on the rig, but do not need or want Internet access for security reasons (the "Rig Access users"). Another group of users may require Internet access, but do not require, nor are allowed to access resources on the rig (the "Internet Access users"). Still another group of users may need access to the Internet as well as all rig resources (the "Full Access users").

To accommodate the above user groups, wired virtual local area networks may be set up for each group to provide the access goals defined. For example, a first virtual local area network may be set up for the Rig Access users and will connect certain ports on the switch labeled "Rig Access" to the specific port on the rig labeled "Rig Server." A second virtual local area network for the Internet Access users may be set up that connects certain other ports on the switch to the router and onto the external Internet connection. Still further, a third virtual local area network may be set up that connects still other ports on the switch to both the Rig Server and Router ports. The defined access goals can be implemented by limiting physical access to the switch. Physical access to the switch can be controlled by plugging users into the specific ports assigned to their level of capability.

For a wireless local area network, a similar network scheme is created, except, instead of ports on the switch, the user selects the network they are allowed to connect to by a unique log-in identification. Each unique log-in identification is associated with a virtual local area network connecting to the specific resources allowed. The log-in identification can be associated with assignment to the virtual local area networks using any known data structures and methods. For example, team members belonging to a Rig Access group would have a first level of access that allows for connection to a Rig Access network. Team members belonging to an Internet Access group would have a second level of access that allows for connection to an Internet Access network. Each different level of access is an authorization to use or access various systems and components of the infrastructure. Team members that are allowed full access would have a third level of access that allows for connection to the Full Access network. Access to each network can be controlled through passwords, or by association of the unique log-in identification with a certain level of access.

In addition to the standard virtual local area networks to control access, the network setup of FIG. 9 may connect to dedicated subnets set up on the rig for the various vendors. Various data processing systems collecting data during mud logging might be connected together on a simple local area network. By creating a virtual local area network dedicated to bringing data from those data processing systems performing mud logging to the a rig access local area network, traffic through only the mud logging network can be limited to only traffic required for communication with the mud logging data processing systems. Alternatively, a second network card having its own internet protocol address could be inserted for connecting the mud logging subnet to the rig access local area network. However, such a solution would require additional hardware and configuration within one of the mud logging data processing systems, and further runs the risk of exposing those mud logging data processing systems to external access or viruses.

The network of FIG. 9 manages the use of scarce bandwidth resources, such as the external Internet link, to prioritize the traffic on that link. The network of FIG. 9 can give bandwidth priority to critical data delivery, which is the primary reason for having external access. Critical data is data which is critical to drilling operations, that is not accessible from another location, such as office 816 of FIG. 8. Critical data delivery along with voice communications are provided at least a minimum certain allocated bandwidth. Whenever critical data delivery or voice communication is in use, they would be assured of having at least that minimum certain allocated bandwidth. The bandwidth allocation may be accomplished by such methods as, for example, but not limited to, using a quality of service and bandwidth filtering on the router. Additionally, the router can also monitor bandwidth consumption to determine what processes or users are utilizing the available bandwidth.

In general, the collaboration infrastructure methods, systems, and apparatuses of the illustrative embodiments ensure wireless connectivity around the area where the equipment rack is located and on a rig floor. If total coverage on the rig is desirable, a site survey to design the placement, number, and type of access points and antennas required for full coverage can be performed. The access points may be placed on the rig with a wire connecting each one back to the switch. These access points may be powered locally by a power injector close to where they are mounted, or powered over Ethernet through the cable connecting them to the switch. Rather than connecting each access point by cable to the switch, the access points can be deployed in a grid or mesh where the first access point is wired to the switch, the second access point connects wirelessly to that access point, and the third connects wirelessly to the second, and so forth. Some mesh access points have only one radio so when they are deployed in a mesh, they can only operate in half duplex (i.e. they can only receive or transmit at any given time, but not both). Some access points have two radios so that they can operate in full duplex and transmit and receive at the same time. In order to provide good quality VOIP through the wireless local area network, the collaboration infrastructure methods, systems, and apparatuses of the invention use access points with two radios, or the access point may also be wired back to the switch. Mesh access points operating in half duplex may not give the necessary quality of service for good quality voice.

The collaboration infrastructure methods, systems, and apparatuses of the invention can also support video monitoring on the rig via video cameras, including wireless video cameras certified for hazardous areas. The output from these cameras can be tailored for the available bandwidth and the application requirements. The size of the picture, the resolution and the frequency of the updates can be reduced to accommodate the available bandwidth for transmission and storage.

Once a user has access to the Internet, they are free to initiate client based virtual private network sessions with the virtual private network gateways set up to access their company's private network. Each user may be securely connected back to their company's internal network. In addition, router based virtual private networks may be connected that would be more permanent and could allow specific subnets on the rig to be linked as if they were connected into their private networks.

As for VOIP, there are many ways to do VOIP today, that provide varying levels of reliability, clarity and flexibility. Each of these levels of service may have application in certain situations. The collaboration infrastructure methods, systems, and apparatuses of the invention are flexible enough to support all of them in appropriate situations, as described below.

The lowest level of VOIP allows communication from computer to computer using a microphone and the sound card in the computer. This capability is typically available for free using Net Meeting or one of several available free VOIP services. This level can be workable if a decent headphone or microphone is provided, but the quality is typically not very good.

The next level is a paid service where the user can connect from their computer to a phone by using the gateway that connects the Internet, to the public switched telephone network. This provides additional capability, however the quality is still subject to the quality of the network connection.

The third level of VOIP uses an analog phone connected to the router and a call manager remotely routes calls from the network to the public switched telephone network. In order to connect the phone to the router, a special card that does the analog to digital conversion is required, as well as, the router must have sufficient digital signal processing capability to compress and massage large volumes of digital information for transmission. If the remote connectivity provider for the rig also provides the call manager, then it is also providing the link from the rig to the hub and can provide the call gateway at the hub that links to the phone network. In that case, the service provider controls the whole path from the rig to the phone network and can prioritize the voice traffic in order to provide high quality voice. The reliability of the voice in this configuration would be much higher than in the previous cases, but of course is still limited by the bandwidth, latency, and quality of the remote network link. A major benefit of this configuration is that the solution can also support FAX, which is still a very popular way for transmitting images and documents.

Finally, the highest quality level of VOIP service involves the use of IP phones connected directly to the rig local area network. This level requires the use of more expensive digital IP phones connected directly to the network. These phones may be harder to get in the event of a failure or damage to the phone, which is another attraction to the previous level where an analog phone can be found in almost any consumer electronics store. This level of service requires a remote call manager like the third level, and this option can be a fairly expensive component of the infrastructure. This level can also support the new WIFI IP phones that connect to the wireless local area network on the rig and provide mobile communications. However, supporting VOIP on the wireless local area network, it has implications on how the wireless local area network is implemented, as discussed above. Another consideration when deciding which level of VOIP to implement is the issue of resilience of the phones on the rig during a remote connectivity outage. There are certain features in the router that can support local phone functions on the rig even if the remote call manager cannot be reached. This feature is called Survivable Remote Site Telephony (SRST) and is an additional cost for the infrastructure at the rig.

The collaboration infrastructure methods, systems, and apparatuses of the invention also account for issues related to hazardous area certification. For example, with respect to rig cabling, there are generally two acceptable ways to cable Ethernet on a rig. The first is to use shielded and armored cable for runs on the rig. This type of cable is certified and is protected from being cut by the armor. The shielding provides noise protection to keep electrical and RF noise from degrading the signal. The second is an acceptable way is to use isolation barriers at each end of the Ethernet cable that limit the amount of power that can be used to transmit the signal. These barriers are available commercially and should be used any time a standard Cat 5 cable is run around a rig.

There are also several issues with wireless communications or related to wireless communications. First, any wireless installation must be capable of shutting down completely during explosive operations such as perforating or certain stuck pipe manipulations. While it is very difficult to eliminate all RF sources during these operations, any precaution that can be taken to minimize risk should be taken. Thus, for example, the collaboration infrastructure methods, systems, and apparatuses of the invention provide formal notification to rig management (e.g., company man, driller, etc.) that wireless connectivity is in operation and that it needs to be turned off during these hazardous operations.

Second are hazardous issues related to clients of the wireless networks. These clients must be certified if they are used in the hazardous areas. There are Zone 1 certified PDAs and rig floor displays available for this purpose. Also, these clients are RF sources and the collaboration infrastructure methods, systems, and apparatuses of the invention require them to be powered off during the hazardous operations on the rig. Just as all cell phones are turned off during explosive operations, so must WIFI clients be powered off.

Wireless access points may be used that are certified such that they cannot provide enough energy through their antenna and thus cannot cause an explosion. Similarly, certified antennas may also be used that can be connected to any access point in a pressurized or safe area and then run outside into the hazardous area.

There are many aspects of IT security that are also accounted for by the collaboration infrastructure methods, systems, and apparatuses of the invention. For example, there are several major activities required to protect any server connected to the Internet. This is especially true if the server is using Microsoft operating systems and tools, but is equally true for any server. First, the collaboration infrastructure methods, systems, and apparatuses of the invention ensure that security patches are applied in a consistent way. Critical security patches protect the system from vulnerabilities that can be exploited by malicious hackers. Typically these patches are released monthly and should be applied in a timely manner. Of course, it is possible that some patches may break some software and are therefore tested before they are deployed in a production environment.

Second is virus protection. Servers on the rig must be set up to automatically update their .dat files on a regular basis and maintain their protection against new viruses being developed daily.

Third is firewall and access protection. The collaboration infrastructure methods, systems, and apparatuses of the invention preferably provide firewall protection via an external firewall appliance. To this end, enterprise class routers can provide firewall protection as well as a detailed control of who can access a server, from where, and on which ports and services. In addition, depending on the operating system deployed, there are software firewalls available that can provide some protection from attacks. Many Internet service providers and remote connectivity providers can also provide "clean" Internet access and protect customers from port scans and other malicious activity by having their own firewalls and security systems.

Servers on rigs will require some level of remote administration. The collaboration infrastructure methods, systems, and apparatuses of the invention preferably implement this administration through a series of options on Microsoft systems, including, but not limited to, Microsoft® Remote Terminal Server, NetMeeting® Remote Desktop Sharing, available from Microsoft Corporation, Timbuktu®, available from Netopia, Inc., RealVNC, available from RealVNC, Ltd., and PCAnywhere® available from Symantec, Corp. Any of these packages allow an administrator to take control of the machine remotely. Each has certain performance and security benefits and issues. In addition to these packages, administration can also be done using Web access to the server. Still other administration can be better done through a command line. All these packages may be susceptible to intermittent network issues and sometimes it will be necessary to reboot the server to clear crashed or hung services. This can be done through a command line using telnet and the like if the Windows interface is hung. There are a number of commercial and shareware packages available that provide these types of services on Windows computers. Remote administration through commercially available appliances that can provide out of band access to the server in the event of network outage or the need to power off and restart the server is also contemplated by the collaboration infrastructure methods, systems, and apparatuses of the invention.

Figure 10:
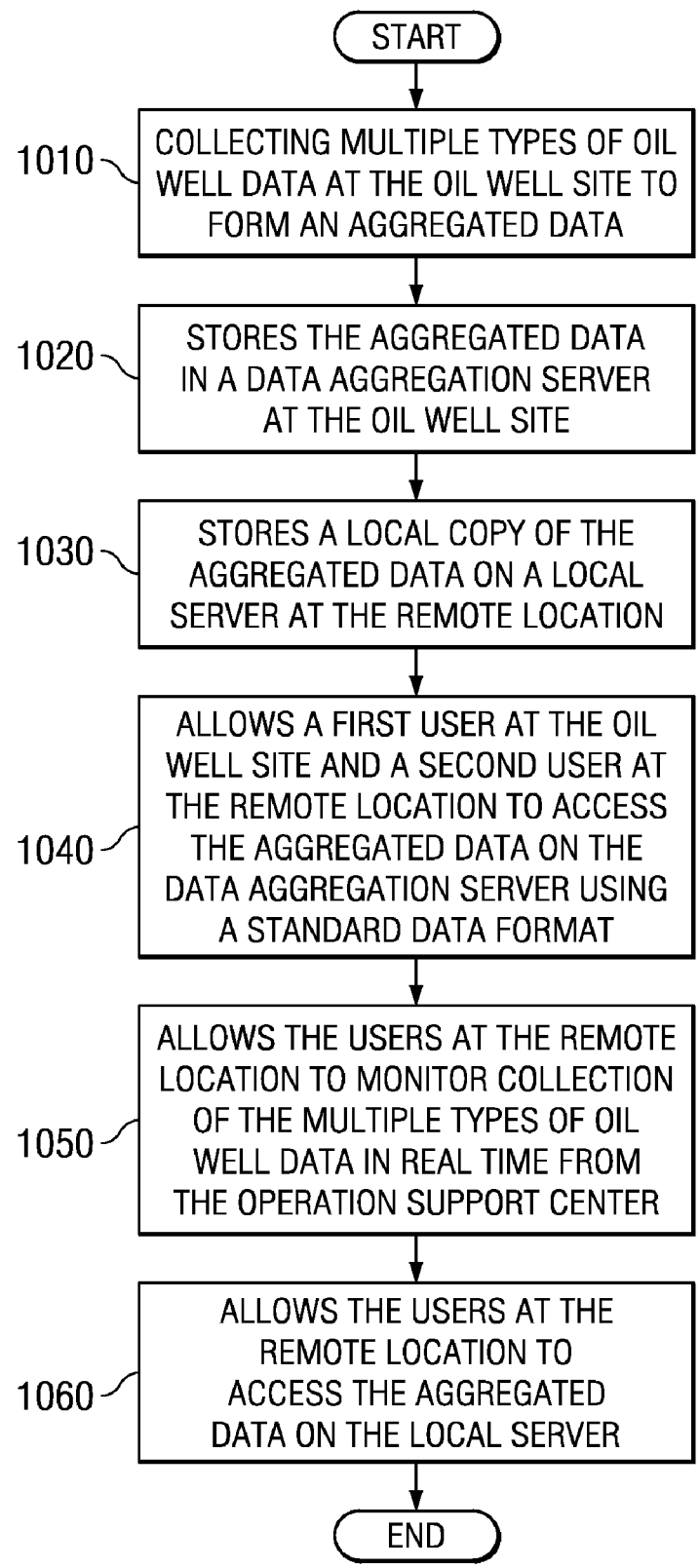
FIG. 10 is a flowchart illustrating the method steps for providing a collaboration infrastructure is shown according to an illustrative embodiment.

Referring now to FIG. 10, a flowchart illustrating the method steps for providing a collaboration infrastructure is shown according to an illustrative embodiment. Process 1000 facilitates the infrastructure of FIG. 8.

Process 1000 begins by collecting multiple types of oil well data at the oil well site to form an aggregated data (step 1010). Process 1000 then stores the aggregated data in a data aggregation server at the oil well site (step 1020).

Process 1000 then stores a local copy of the aggregated data on a local server at the remote location (step 1030). Process 1000 then allows a first user at the oil well site and a second user at the remote location to access the aggregated data on the data aggregation server using a standard data format (step 1040).

Process 1000 allows the users at the remote location to monitor collection of the multiple types of oil well data in real time from the operations support center (step 1050). Process 1000 allows the users at the remote location to access the aggregated data on the local server (step 1060), with the process terminating thereafter.

The collaboration infrastructure methods, systems, and apparatuses of the invention also provide real-time monitoring to ensure problems with the infrastructure are detected before they delay drilling operations, and to facilitate fast and straightforward troubleshooting. Monitoring is also performed to provide objective measures of whether the infrastructure is delivering the service levels agreed in any contract.

In one implementation, commercially available basic server monitoring is used to provide early detection of problems related to server load, disk space, memory consumption or other common problems related to server management. To this end, commercial tools are available that can give early warning of disk space issues or processor overload.

Network monitoring is also performed to detect network abuse or configuration issues or even hardware failures causing reduced performance. Network monitoring can identify bottlenecks or problems due to viruses or worms, or other compromises of the security of the infrastructure. Monitoring the wireless network can detect rogue access points, unauthorized users or outages, or connectivity issues with the access points.

The collaboration infrastructure methods, systems, and apparatuses of the invention also perform application monitoring in order to measure the overall effectiveness of the infrastructure and detect problems with data delivery before users or applications are affected.

Furthermore, as drilling rigs are operating around-the-clock and teams need to collaborate together during critical periods regardless of the time of day or night, a solid support hierarchy must be in place. To this end, the collaboration infrastructure methods, systems, and apparatuses of the invention also provide an around-the-clock help desk that can take phone calls, log issues in an issue tracking system, and either resolve the issue or escalate it to the appropriate resource. Detailed troubleshooting procedures implemented by the collaboration infrastructure methods, systems, and apparatuses of the invention allow this first line of support to begin resolution immediately and effectively route the problem for resolution as needed.

A second line of support involves network and remote connectivity support or a dedicated engineer assigned to the rig. The second line of support is invoked if the first line of support is unable to resolve the issue, but it can be determined that connectivity is the cause. If the problem is still unresolved, then it is escalated to the remote connectivity vendor.

Remote connectivity from the rig to the remote location is required in order for the virtual team to communicate. In one implementation, the collaboration infrastructure methods, systems, and apparatuses of the invention provide this remote connectivity via mobile satellite connections that offer varying amounts of bandwidth as required. These mobile satellite connections can typically provide Internet access or direct access to a private corporate network.

In addition to satellite, other solutions based on wireless technologies like WiMax and long range WiFi may also be used to provide broadband connectivity to the rig. These alternative solutions have the benefits of potentially lower bandwidth charges and higher ultimate throughput as well as reduced latency due to the lack of satellite hops.

Although the foregoing is provided for purposes of illustrating, explaining and describing certain embodiments of the invention in particular detail, modifications and adaptations to the described methods, systems and other embodiments will be apparent to those skilled in the art and may be made without departing from the scope or spirit of the invention.

What is claimed is:

1. A method of facilitating collaboration between users at an oil well site and users at a remote location, comprising:
   collecting multiple types of oil well data at the oil well site to form an aggregated data;
   conforming the aggregated data to a standard format;
   storing the aggregated data in a data aggregation server at the oil well site in the standard format, wherein the data aggregation server comprises a data repository having a set of analysis tools configured to analyze the aggregated data;
   mapping one or more of the oil well data with one or more descriptions associated therewith;
   storing the mapping in a knowledge base at the oil well site, wherein the mapping is used to conform unknown oil well data to the standard format;
   storing a copy of the aggregated data and the mapping on a local server at the remote location, wherein the local server mirrors the data aggregation server;
   allowing a first user at the oil well site to:
      access the aggregated data on the data aggregation server; and
      analyze the aggregated data on the data aggregation server using the set of analysis tools;
   allowing a second user at the remote location to:
      access the aggregated data stored on the local server; and
      analyze the aggregated data on the local server using the set of analysis tools.

2. The method according to claim 1, wherein the users at the oil well site access the multiple types of oil well data via one or more private virtual local area networks, each local area network allowing a different level of access to the multiple types of oil well data.

3. The method according to claim 1, wherein the users at the remote location access the multiple types of oil well data via a satellite communication link.

4. The method according to claim 1, further comprising providing an operations support center at the remote location and allowing the users at the remote location to monitor collection of the multiple types of oil well data in real time from the operations support center.

5. The method according to claim 1, wherein the users at the oil well site and the users at the remote location access the multiple types of oil well data using one or more of: a Web-based viewer and an interactive viewer.

6. The method according to claim 1, wherein the oil well site is an offshore site and the remote location is an onshore location.

7. A method for controlling a drilling operation for an oilfield, the oilfield having a wellsite with a drilling tool advanced into a subterranean formation with geological structures and reservoirs therein, comprising:
   collecting multiple types of oil well data at the oil well site to form an aggregated data that conforms to a standard format;
   storing the aggregated data in a data aggregation server at the oil well site, wherein the data aggregation server comprises a data repository having a set of analysis tools configured to analyze the aggregated data;
   mapping one or more of the oil well data with one or more descriptions associated therewith;
   storing the mapping in a knowledge base at the oil well site, wherein the mapping is configured to conform unknown oil well data to the standard format;
   storing a copy of the aggregated data and the mapping on a local server at a remote location, wherein the local server mirrors the data aggregation server;
   allowing a first user at the oil well site to:
      access the aggregated data on the data aggregation server; and
      analyze the aggregated data on the data aggregation server using the set of analysis tools;
   allowing a second user at the remote location to:
      access the aggregated data stored on the local server; and
      analyze the aggregated data on the local server using the set of analysis tools;
   controlling drilling operations based on the aggregated data.

8. The method according to claim 7, wherein the users at the oil well site access the multiple types of oil well data via a set of private virtual local area networks and wherein each private virtual local area network in the set of private virtual local area networks allows a different level of access to the multiple types of oil well data.

9. The method according to claim 7, wherein the second user at the remote location accesses the multiple types of oil well data via a satellite communication link.

10. The method according to claim 7, further comprising providing an operations support center at the remote location and allowing the second user at the remote location to monitor collection of the multiple types of oil well data in real time from the operations support center.

11. The method according to claim 7, wherein the users at the oil well site and the second user at the remote location access the multiple types of oil well data using one or more of: a Web-based viewer and an interactive viewer.

12. The method according to claim 7, wherein the oil well site is an offshore site and the remote location is an onshore location.

13. The method of claim 1, wherein the first user and the second user locally access the aggregated data in real time without using a communication link.

* * * * *